US012136763B2

(12) United States Patent
Zou et al.

(10) Patent No.: US 12,136,763 B2
(45) Date of Patent: Nov. 5, 2024

(54) ANTI-INTERFERENCE MICROWAVE ANTENNA

(71) Applicant: Shenzhen Merrytek Technology Co., Ltd., Shenzhen (CN)

(72) Inventors: Gaodi Zou, Shenzhen (CN); Xin Zou, Shenzhen (CN)

(73) Assignee: Shenzhen Merrytek Technology Co., Ltd., Shenzhen (CN)

( * ) Notice: Subject to any disclaimer, the term of this patent is extended or adjusted under 35 U.S.C. 154(b) by 243 days.

(21) Appl. No.: 17/712,184

(22) Filed: Apr. 3, 2022

(65) Prior Publication Data

US 2022/0231410 A1 Jul. 21, 2022

Related U.S. Application Data

(63) Continuation-in-part of application No. 16/862,592, filed on Apr. 30, 2020, now abandoned, which is a continuation of application No. 16/244,116, filed on Jan. 10, 2019, now Pat. No. 10,680,321, which is a continuation of application No. 16/127,196, filed on Sep. 10, 2018, now Pat. No. 10,263,327, which is a continuation of application No. 16/035,689, filed on Jul. 15, 2018, now Pat. No. 10,680,320.

(51) Int. Cl.

| | |
|---|---|
| ***H01Q 1/52*** | (2006.01) |
| ***H01Q 5/328*** | (2015.01) |
| ***H01Q 21/00*** | (2006.01) |
| ***H01Q 21/06*** | (2006.01) |
| *H01Q 9/16* | (2006.01) |

(52) U.S. Cl.
CPC ............... *H01Q 1/521* (2013.01); *H01Q 1/52* (2013.01); *H01Q 5/328* (2015.01); *H01Q 21/00* (2013.01); *H01Q 21/0075* (2013.01); *H01Q 21/065* (2013.01); *H01Q 9/16* (2013.01)

(58) Field of Classification Search
CPC .... H01Q 1/521; H01Q 5/328; H01Q 21/0075; H01Q 21/065; H01Q 1/52; H01Q 21/00
See application file for complete search history.

(56) References Cited

U.S. PATENT DOCUMENTS

| | | | | |
|---|---|---|---|---|
| 4,386,357 A * | 5/1983 | Patton | H01Q 9/0442 | 343/700 MS |
| 5,041,838 A * | 8/1991 | Liimatainen | H01Q 1/3275 | 343/700 MS |
| 6,014,105 A * | 1/2000 | Davis | H01Q 9/0442 | 343/700 MS |

(Continued)

*Primary Examiner* — Hai V Tran
(74) *Attorney, Agent, or Firm* — David & Raymond Patent Firm; Raymond Y Chan

(57) ABSTRACT

An anti-interference microwave antenna includes a reference ground and at least one radiating source spacedly disposed at the reference ground to define a radiating clearance between the radiating source and the reference ground, wherein the radiating source is electrically connected to the reference ground to ground the radiating source so as to narrow a bandwidth of the antenna. When an electromagnetic excitation signal is received at a feed point of the radiating source, the bandwidth of the antenna is narrowed down to prevent any interference of the electromagnetic wave signal received or generated by the antenna in response to nearby electromagnetic radiation frequency or stray radiation frequency of the adjacent frequency bands.

16 Claims, 14 Drawing Sheets

(56) References Cited

U.S. PATENT DOCUMENTS

| | | | | |
|---|---|---|---|---|
| 6,639,558 | B2 * | 10/2003 | Kellerman | H01Q 21/28 343/846 |
| 7,295,167 | B2 * | 11/2007 | Aminzadeh | H01Q 5/40 343/846 |
| 2003/0164797 | A1 * | 9/2003 | Ngai | H01Q 1/523 343/700 MS |

* cited by examiner

ANTI-INTERFERENCE MICROWAVE ANTENNA

CROSS REFERENCE OF RELATED APPLICATION

This is a Continuation-In-Part application that claims the benefit of priority under 35U.S.C. § 120 to a non-provisional application, application Ser. No. 16/862,592, filed Apr. 30, 2020, which is a Continuation application that claims the benefit of priority under 35U.S.C. § 120 to a non-provisional application, application Ser. No. 16/244,116, filed Jan. 10, 2019, which is a Continuation application that claims the benefit of priority under 35U.S.C. § 120 to a non-provisional application, U.S. Pat. No. 10,263,327, issued Apr. 16, 2019, which is Continuation application that claims the benefit of priority under 35U.S.C. § 120 to a non-provisional application, application Ser. No. 16/035,689, filed Jul. 15, 2018, which is a non-provisional that claims which claims priority under 35 U.S.C. 119 (a-d) to Chinese application number 201810595979.X, filed Jun. 11, 2018. The afore-mentioned patent applications are hereby incorporated by reference in their entireties.

BACKGROUND OF THE PRESENT INVENTION

Field of Invention

The present invention relates to an antenna, and more particularly to an antenna with an anti-interference arrangement, wherein the anti-interference arrangement prevents electromagnetic wave signals received or generated by the antenna from being interfered by the nearby electromagnetic radiation frequency or the stray radiation frequency, so as to enhance the anti-interference ability of the antenna.

Description of Related Arts

Industrial Scientific and Medical (ISM) Bands are designated by ITU-R (ITU Radio-communication Sector) and are unlicensed radio bands reserved internationally for the use of radio frequency (RF) telecommunications by institutions such as industry, science, and medicine institutions. During the use of these bands, the transmission power thereof must be restricted (usually lower than 1 W) and must not be interfere with other frequency bands. Nowadays, these ITU-R opened frequency bands being used for microwave detection are mainly set at 2.4 GHz, 5.8 GHZ, 10.52 GHz, and 24.125 GHz. In recent years, new frequency bands are frequently utilized for the application of microwave detection. For example, the application of 5G technology will cause a new frequency band being used for microwave detection in addition to the existing frequency bands being already used for microwave detection. It is known that there will be a mutual interference when two or more frequency bands are used closely. For the microwave detection as an example, when the 5.8 GHz of frequency band is used for human or object motion detection, such 5.8 GHz of frequency band will be inevitably interfered by the application of 5G technology. As a result, the interference of the application of 5G technology will cause the inaccuracy of the detection result from the 5.8 GHz of frequency band. As the 5G technology is rapidly well-developed recently, the 5G system will be more open and the application thereof will be widely used. It can be foreseen that the large-scale application of 5G technology will inevitably form a high speed based on 5G data network and will continuously expand more frequency bands in the future. In other words, the possibility of interference of the frequency bands for the microwave detection will be highly increased by the application of 5G technology. Therefore, it is urgent to improve the antennas with anti-interfering ability for the microwave detection. Accordingly, a conventional method for enhancing the anti-interfering ability for the microwave detection antenna is the suppression method by shielding external wireless signals, signal filtering, and software algorithm processing to suppress the interference. However, such conventional method can only provide limited anti-interfering ability for limited frequency bands. Therefore, a need exists for an antenna that enhances the anti-interfering ability to different frequency bands. It is to the provision of such an antenna that the present disclosure is primarily directed.

SUMMARY OF THE PRESENT INVENTION

The invention is advantageous in that it provides an antenna with an anti-interference arrangement and method, wherein the anti-interference arrangement enhances the anti-interference ability of the antenna.

Another advantage of the invention is to an antenna with an anti-interference arrangement and method, wherein the anti-interference arrangement prevents electromagnetic wave signals received or generated by the antenna from being interfered by the nearby electromagnetic radiation frequency or the stray radiation frequency.

Another advantage of the invention is to an antenna with an anti-interference arrangement and method, wherein the impedance of the antenna is lowered to narrow the bandwidth thereof so as to prevent electromagnetic wave signals received or generated by the antenna from being interfered by the nearby electromagnetic radiation frequency or the stray radiation frequency.

Another advantage of the invention is to an antenna with an anti-interference arrangement and method, wherein the impedance of the antenna is lowered to enhance the radiating energy of the primary radiating wave within its radiating wave band, so as to reduce the harmonic radiation of the antenna.

Another advantage of the invention is to an antenna with an anti-interference arrangement and method, wherein the anti-interference circuit has a low impedance to match with the low impedance of the antenna in order to narrow the bandwidth of the antenna so as to prevent any interference of electromagnetic wave signals received or generated by the antenna of the present invention in response to the nearby electromagnetic radiation frequency.

Another advantage of the invention is to an antenna with an anti-interference arrangement and method, wherein the radiating source is grounded to reduce the impedance of the antenna.

Another advantage of the invention is to an antenna with an anti-interference arrangement and method, wherein the radiating source is electrically connected to the reference ground to ground the radiating source.

Another advantage of the invention is to an antenna with an anti-interference arrangement and method, wherein the anti-interference circuit provides a relatively large excitation current to the radiating source to ensure the stable operation of the antenna.

Another advantage of the invention is to an antenna with an anti-interference arrangement and method, wherein the radiating source has at least a radiating connection point electrically connected to the reference ground. A distance between the periphery of radiating source and the radiating connection point thereof is preset to generate an inductance therebetween under the excitation of the microwave excitation electrical signal.

Another advantage of the invention is to an antenna with an anti-interference arrangement and method, wherein a distance between at least one feed point and at least one radiating connection point is greater than or equal to 1/64λ to generate an inductance therebetween under the excitation of the micro wave excitation electrical signal.

Another advantage of the invention is to an antenna with an anti-interference arrangement and method, wherein by forming the radiating connection point of the radiating source at the physical center point thereof, the impedance of the antenna will be lowered under resonance state to enhance the anti-interference ability of the antenna.

Another advantage of the invention is to an antenna with an anti-interference arrangement and method, wherein the electrical connection element has two terminal ends electrically connecting with the radiating source and the reference ground respectively to reduce the internal impedance of the antenna under resonance state so as to enhance the anti-interference ability of the antenna.

Another advantage of the invention is to an antenna with an anti-interference arrangement and method, wherein the radiating connection point is overlapped with the feed point to electrically connect the feed point with the reference ground for reducing the internal impedance of the antenna under resonance state so as to enhance the anti-interference ability of the antenna.

Additional advantages and features of the invention will become apparent from the description as follows and may be realized by means of the instrumentalities and combinations particular point out in the appended claims.

According to the present invention, the foregoing and other objects and advantages are attained by an antenna, comprising:

a reference ground; and at least one radiating source spacedly disposed at the reference ground to define a radiating clearance between the radiating source and the reference ground, wherein the radiating source is electrically connected to the reference ground to ground the radiating source so as to narrow a bandwidth of the antenna.

In one embodiment, the at least one radiating source has at least one feed point and at least one radiating connection point, wherein the at least one feed point deviates from a physical center point of the at least one radiation source.

In one embodiment, a same set of radiating connection points are respectively positioned at vertices of a regular polygon having a center point which is the physical center point of the at least one radiating source, wherein the radiating connection points of the same set of radiating connection points are arranged to each having an equal distance with respect to the physical center point of the corresponding radiating source and distributed around the physical center point of the corresponding radiating source with equal angle therebetween.

In one embodiment, the at least one radiating source is electrically connected to the reference ground at the radiating connection points of the at least one radiating source so as to feed in excitation signals at the at least one feed point of the at least one radiating source, wherein since the at least one radiating source is electrically connected with the reference ground at the radiating connection points, a zero potential point is formed at the physical center point of the at least one radiating source and an equivalent connection with the reference ground so as to narrowing a bandwidth of the antenna.

In one embodiment, a same pair of radiating connection points are symmetrically distributed at the at least one radiating source with respect to the physical center point of the at least one radiating source, wherein in correspondence to connection lines between the same pair of the radiating connection points and a center point which is the physical center point of the at least one radiating source, wherein the at least one radiating source is electrically connected with the reference ground at the radiating connection points, so as to receive excitation signals at the at least one feed point of the at least one radiating source, wherein since the at least one radiating source is electrically connected with the reference ground at the radiating connection points, a zero potential point is formed at the physical center point of the at least one radiating source and an equivalent connection with the reference ground so as to narrowing a bandwidth of the antenna.

In one embodiment, the antenna provides at least two feed points distributed at the at least one radiating source around the physical center point thereof evenly and symmetrically, wherein the radiating source is arranged in such a manner that the at least two feed points are connected for at least two excitation signals with opposite phases so as to enable the at least two feed points to be distributed in symmetrical form with respect to the physical center point to strengthen the zero potential characteristic of the physical center point of the at least one radiating source.

In one embodiment, the antenna provides at least two feed points distributed at the at least one radiating source, wherein each of the feed points can be fed with excitation signals and emit electromagnetic waves, or receive electromagnetic waves, including the reflecting waves generated and reflected from the object that the emitted electromagnetic waves encountered.

In one embodiment, the antenna provides at least two feed points distributed at the at least one radiating source, wherein a first feed point of the at least two feed points is configured to emit electromagnetic waves and a second feed point of the at least two feed points is configured to receive electromagnetic waves while the first and second feed points have a predetermined distance therebetween and are preferably arranged perpendicularly.

In one embodiment, the antenna provides at least two feed points distributed at the at least one radiating source, wherein each of the at least two feed points has a polarization direction (i.e. the direction from the feed point to the physical center point of the radiating source) arranged in perpendicular manner with respect to the physical center point of the radiating source, so as to respectively receive at least two excitation signals with a phase difference of 90 degrees to form an antenna with circular polarization, or alternatively, one of the at least two feed points is configured for receiving excitation signals and another one of the at least two feed points is configured for receiving the corresponding feedback signals so as to enable the antenna achieving a certain degree of isolation of transceiver separation.

In one embodiment, the antenna provides two feed points in a such a manner that connection lines between the two feed points to the physical center point of the at least one radiating source are perpendicular with each other.

In one embodiment, the antenna provides three feed points, wherein a first feed point and a second feed point of the three feed points are symmetrically distributed at the at least one radiating source with respect to the physical center point of the at least one radiating source, while a third feed point of the three feed points is arranged in such a manner that a connecting line between the third feed point and the physical center point of the radiating source is perpendicular to a connecting line between the first and the second feed points of the three feed points.

In one embodiment, the antenna provides four feed points, wherein each of the four feed points is distributed at an equal angle around the physical center point of the at least one radiating source while an equal distance is arranged between each of the four feed points with the physical center point of the at least one radiating source which is electrically connected to the reference ground.

In one embodiment, the radiating source is in the form of a metal patch spacedly and intervally arranged on one side of the reference ground.

In accordance with another aspect of the invention, the present invention comprises a method of manufacturing an antenna which comprises at least a radiating source and a reference ground, comprising the following steps.

(A) Spacedly dispose the radiating source at the reference ground to define a radiation clearance between the radiating source and the reference ground.

(B) Electrically connect the radiating source to the reference ground to ground the radiating source so as to narrow a bandwidth of the antenna.

In accordance with another aspect of the invention, the present invention comprises a method of enhancing an anti-interference ability of an antenna which comprises at least a radiating source and a reference ground, comprising the following steps.

(1) Form a radiating clearance between the radiating source and the reference ground.

(2) Ground the radiating source by electrically connecting the radiating source to the reference ground to reduce an internal impedance of the antenna, such that when an electromagnetic excitation signal is received at a feed point of the radiating source, a bandwidth of the antenna is narrowed down to prevent any interference of the electromagnetic wave signal received or generated by the antenna in response to nearby electromagnetic radiation frequency or stray radiation frequency of the adjacent frequency bands.

Still further objects and advantages will become apparent from a consideration of the ensuing description and drawings.

These and other objectives, features, and advantages of the present invention will become apparent from the following detailed description, the accompanying drawings, and the appended claims.

Figure 1:
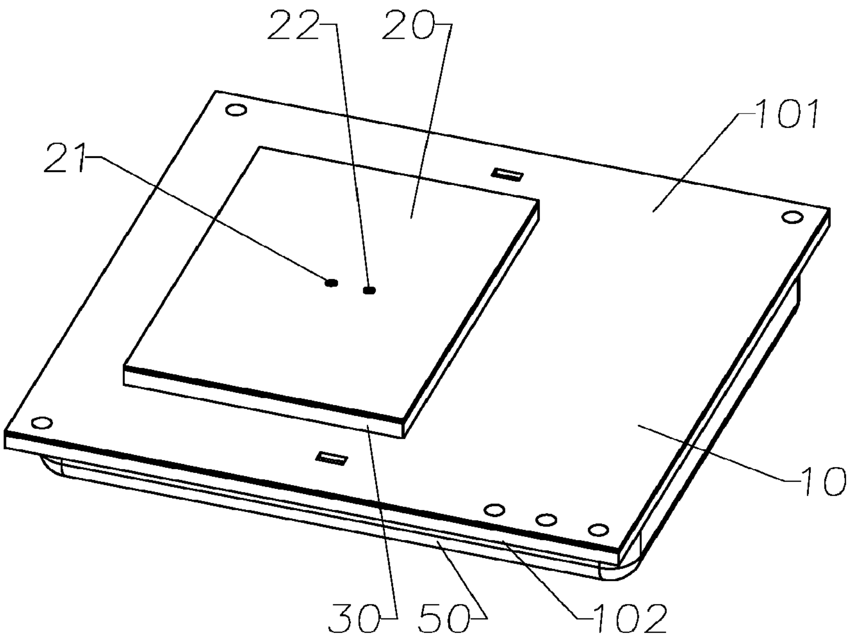
FIG. 1 is a perspective view of an antenna with an anti-interference arrangement according to a first preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms “longitudinal”, “transverse”, “upper”, “lower”, “front”, “rear” “left”, “right”, “vertical”, “horizontal”, “top”, “bottom”, “exterior”, and “interior” in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms “one”, “a”, and “an” in the following description refer to “at least one” or “one or more” in the embodiment. In particular, the term “a” in one embodiment may refer to “one” while in another embodiment may refer to “more than one”. Therefore, the above terms should not be an actual numerical limitation of the elements of the present invention.

Figure 2:
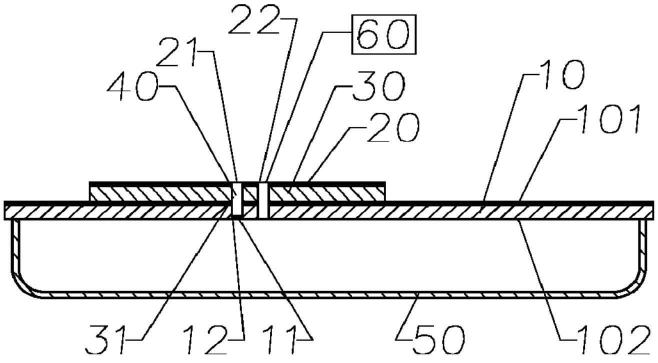
FIG. 2 is a sectional view of the antenna according to the above first preferred embodiment of the present invention.

Referring to FIGS. 1 and 2 of the drawings, an antenna according to a preferred embodiment of the present invention is illustrated, wherein the antenna comprises a reference ground 10 and at least a radiating source 20 spacedly disposed at the reference ground 10 on a first side 101 thereof to form an antenna body. Accordingly, the antenna further comprises an oscillating circuit electrically coupled to the antenna body.

It is worth mentioning that the radiating source 20 of the present invention is spaced apart from the reference ground 10 that there is not direct contact between the reference ground 10 and the radiating source 20. In particular, a space is formed between the reference ground 10 and the radiating source 20 as a radiating clearance 30 therebetween.

Figure 7A:
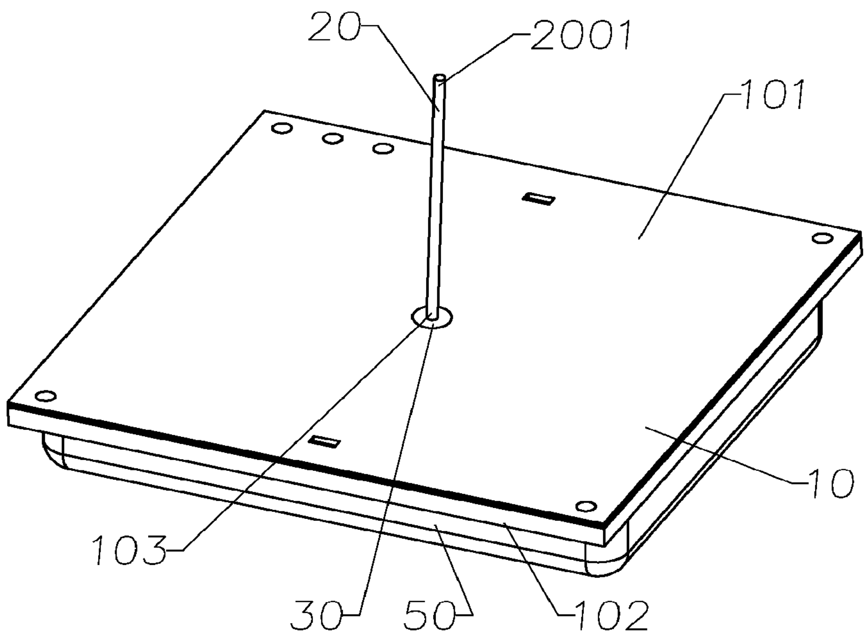
FIG. 7A illustrates a fourth alternative mode of the antenna according to the above first preferred embodiment of the present invention.
Figure 7B:
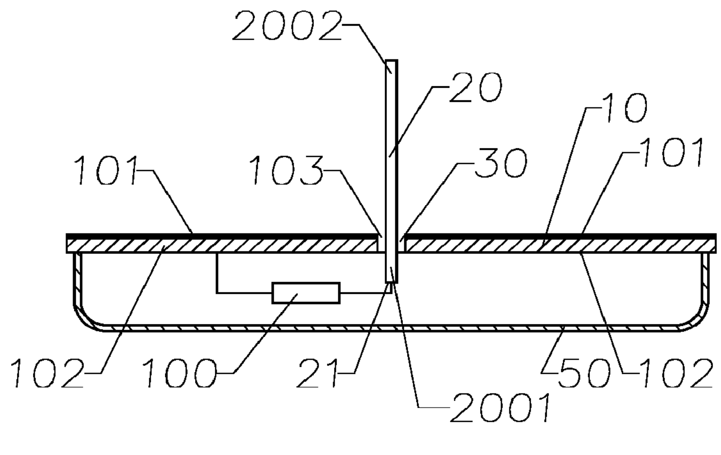
FIG. 7B is a sectional view of the fourth alternative mode of the antenna according to the above first preferred embodiment of the present invention.

Furthermore, the radiating clearance 30 defined between the reference ground 10 and the radiating source 20 refers a surface difference between a surface of the reference ground 10 and a surface of the radiating source 20. In one embodiment, the radiating clearance 30 defined between the reference ground 10 and the radiating source 20 is a height difference between the first side 101 of the reference ground 10 and an outer surface of the radiating source 20, as shown in FIGS. 1 and 2. In another embodiment, the radiating clearance 30 defined between the reference ground 10 and the radiating source 20 is a gap between the first side 101 of the reference ground 10 and a circumferential surface of the radiating source 20, as shown in FIGS. 7A and 7B. Therefore, the formation of the radiating clearance 30 between the reference ground 10 and the radiating source 20 should not be limited by only two designated surfaces thereof.

As shown in FIGS. 1 and 2, the radiating source 20 is electrically connected to the reference ground 10, wherein the radiating source 20 is grounded. It is worth mentioning that the configuration of the conventional antenna is that the radiating source is not grounded and is not electrically connected to the reference ground. By grounding the radiating source 20, an impedance of the antenna of the present invention can be substantially reduced to narrow down a bandwidth of the antenna, so as to avoid any interference of electromagnetic wave signals received or generated by the antenna of the present invention by electromagnetic radiation frequency or stray radiation frequency of the adjacent frequency bands.

As shown in FIGS. 1 and 2, the radiating source 20 has at least a radiating connection point 21 and a feed point 22. The reference ground 10 further has at least a reference ground connection point 11. The radiating connection point 21 of the radiating source 20 is electrically connected to the reference ground connection point 11 of the reference ground 10, such that the radiating source 20 is grounded. In addition, the feed point 22 of the radiating source 20 is arranged to be connected to an excitation current. Accordingly, the oscillating circuit is connected to the feed point 22 of the antenna body to generate the electromagnetic wave signal (microwave excitation electrical signal). Once the excitation current is received by the feed point 22 of the radiating source 20, the antenna will initialize at a polarization direction that the radiating source 20 will generate radiate energy at a radial and outward direction. As it is mentioned, the radiating source 20 is electrically connected to the reference ground 10 to ground the radiating source 20. Once the excitation current is received by the feed point 22 of the radiating source 20, a predetermined impedance is generated between the radiating connection point 21 and the feed point 22 of the radiating source due to the inductance characteristics therebetween. As a result, the antenna will be excited and initialized at a polarization direction to generate radiate energy at the radiating source 20 at a radial and outward direction. At the same time, the impedance will be lowered between the radiating connection point 21 and the feed point 22 of the radiating source due to the inductance characteristics therebetween, so as to narrow down the bandwidth of the antenna. By narrowing the bandwidth of the antenna, any interference of electromagnetic wave signals received or generated by the antenna of the present invention will be substantially reduce in response to the electromagnetic radiation frequency or stray radiation frequency of the adjacent frequency bands. It is worth mentioning that the feed point 22 of the radiating source 20 must be deviated from a physical center point thereof, so that it is easily excited by the excitation current. In addition, there must be an impedance between the radiating source 20 and the reference ground 10 in order to excite the radiating source 20. Even though the radiating connection point 21 of the radiating source 20 is grounded, the impedance will be generated between the radiating connection point 21 and the feed point 22 in response to the inductance characteristics therebetween under the high frequency excitation signal. It is worth mentioning that even the impedance is generated, such impedance is relatively low.

It is worth mentioning that the impedance of the antenna is lowered to enhance the radiating energy of the primary radiating wave within its radiating wave band, so as to reduce the harmonic radiation of the antenna. Accordingly, the antenna not only generates the electromagnetic waves in its radiation frequency band but also generates harmonic wave at frequency multiplication of its radiation frequency band, which is stray radiation.

Preferably, a distance between the radiating connection point 21 and the feed point 22 of the radiating source 20 is greater than or equal to $\frac{1}{64}\lambda$, where $\lambda$ is the wavelength of the electromagnetic wave signal received or generated by the antenna. Under the excitation of the excitation electrical signal, the electromagnetic wave signal will generate the inductance characteristics between the radiating connection point 21 and the feed point 22 of the radiating source 20. Since the feed point 22 of the radiating source 20 is deviated from the physical center point thereof, the intensity required for the excitation current of the antenna to the electromagnetic wave signal will be substantially reduced. As a result, once the excitation current is received by the feed point 22 of the radiating source 20, the antenna is easily initialized at a polarization direction.

As shown in FIGS. 1 and 2, the radiating connection point 21 of the radiating source 20 is preferably defined as the physical center point thereof. In other words, the physical center point of the radiating source 20 is electrically connected to the reference ground 10 to ground the radiating source 20. Therefore, by forming the radiating connection point 21 of the radiating source 20 at the physical center point thereof, the antenna can evenly and stably generate the radiate energy via the radiating source 20 in a radial and outward direction after the initial polarization direction is generated. It should be understood by a person who skilled in the art that the inductance is generated between the periphery of the radiating source 20 and the feed point 22 thereof under the excitation of the excitation current, and the resonant circuit of the antenna with a distributed capacitance is generated between the radiating source 20 and the reference ground 10 for receiving or generating the electromagnetic wave signal.

Figure 3:
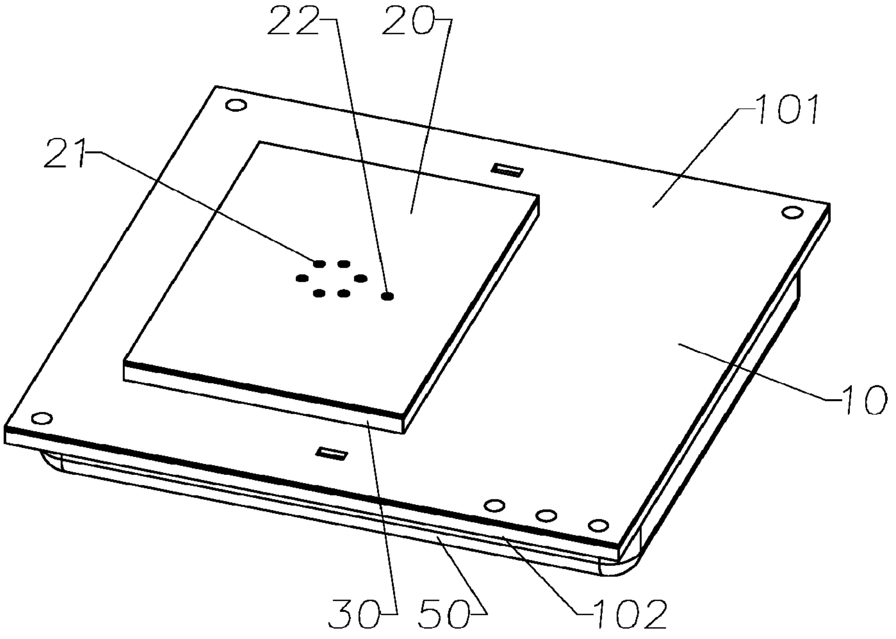
FIG. 3 illustrates a first alternative mode of the antenna according to the above first preferred embodiment of the present invention.

As shown in FIGS. 1 and 2, there is one radiating connection point 21 of the radiating source 20. In another embodiment as shown in FIG. 3, there are two or more radiating connection points 21 of the radiating source 20, wherein the physical center point of the radiating source 20 is surrounded by the radiating connection points 21 of the radiating source 20. In addition, a distance between the periphery of radiating source 20 and the radiating connection points 21 thereof is preset. Under the excitation of the electromagnetic wave signal, the inductance characteristics will be generated between the radiating connection point 21 and the feed point 22 of the radiating source 20. Then, when the excitation current is received by the feed point 22 of the radiating source 20, the impedance of the antenna is lowered to narrow down the bandwidth thereof. In addition, a distance between the feed point 22 and any one of the radiating connection points 21 is greater than or equal to $\frac{1}{64}\lambda$, as shown in FIG. 3.

As shown in FIGS. 1 and 2, the antenna further comprises an electrical connection element 40 having two terminal ends electrically connecting with the radiating connection point 21 of the radiating source 20 and the reference ground connection point 11 of the reference ground 10 respectively. Therefore, the electrical connection element 40 forms an electrical connection media to electrically connect the radiating source 20 and the reference ground 10 with each other so as to ground the radiating source 20.

As shown in FIGS. 1 and 2, the radiating connection point 21 of the radiating source 20 is preferably aligned with the reference ground connection point 11 of the reference ground 10. In other words, the extension direction between the radiating connection point 21 of the radiating source 20 and the reference ground connection point 11 of the reference ground 10 is perpendicular to the first side of reference ground 10.

It is worth mentioning that the electrical connection element 40 is preferably coupled between the radiating source 20 and the reference ground 10, such that the terminal ends of the electrical connection element 40 can be electrically connected to the radiating connection point 21 of the radiating source 20 and the reference ground connection point 11 of the reference ground 10 respectively, so as to electrically connect the radiating source 20 with the reference ground 10. According to the preferred embodiment as one of the examples, the radiating source 20 is initially retained adjacent to the first side 101 of the reference ground 10 to form the radiating clearance 30 between the reference ground 10 and the radiating source 20. Then, a reference ground slot 12 is formed at an opposed second side 102 of the reference ground 10, wherein the reference ground slot 12 is extended corresponding to the radiating source 20. It should be understood that the radiating clearance 30 between the radiating source 20 and the reference ground 10 is a solid media, as shown in FIGS. 1 and 2. In other words, at the same time when the reference ground slot 12 is formed, a clearance slit 31 is also formed within the radiating clearance 30, wherein the reference ground slot 12 of the reference ground 10 is communicated with and extended through the clearance slit 31 of the radiating clearance 30. The radiating connection point 21 of the radiating source 20 is set corresponding to the reference ground slot 12 of the reference ground 10 and the clearance slit 31 of the radiating clearance 30. Next, a molding element is sequentially extended to the reference ground slot 12 of the reference ground 10 and the clearance slit 31 of the radiating clearance 30 in order to connect the molding element to the radiating connection point 21 of the radiating source 20 and to connect the molding element to the reference ground 10. Therefore, the molding element is configured as the electrical connection element 40 to electrically connect the radiating source 20 and the reference ground 10 with each other. In addition, the connection point between the molding element and the reference ground 10 becomes the reference ground connection point 11 thereof.

It is worth mentioning that the molding element can be, but not limited to, a gold wire, silver wire or other conducive wires according to the preferred embodiment. When the molding element is used as the connection wire, the connection wire is extended from the reference ground slot 12 of the reference ground 10 and the clearance slit 31 of the radiating clearance 30 to the radiating connection point 21 of the radiating source 20 and to connect to the reference ground 10, so as to form the electrical connection element 40 to electrically connect the radiating source 20 and the reference ground 10 with each other. Alternatively, one end of the connection wire is initially connected to the radiating connection point 21 of the radiating source 20. Then, the radiating source 20 is retained close to the first side 101 of the reference ground 10, wherein the connection wire is extended through the reference ground slot 12 of the reference ground 10 to connect with the reference ground 10, so as to form the electrical connection element 40 to electrically connect the radiating source 20 and the reference ground 10 with each other. In one embodiment, the molding element can be, but not limit to, fluid material, wherein the molding element is filled into the reference ground slot 12 of the reference ground 10 and the clearance slit 31 of the radiating clearance 30. Once the molding element is solidified, the molding element forms the electrical connection element 40 to electrically connect the radiating source 20 and the reference ground 10 with each other.

As shown in FIGS. 1 and 2, the antenna further comprises a shield member 50 coupled at the reference ground 10 at the second side 102 thereof.

Figure 4:
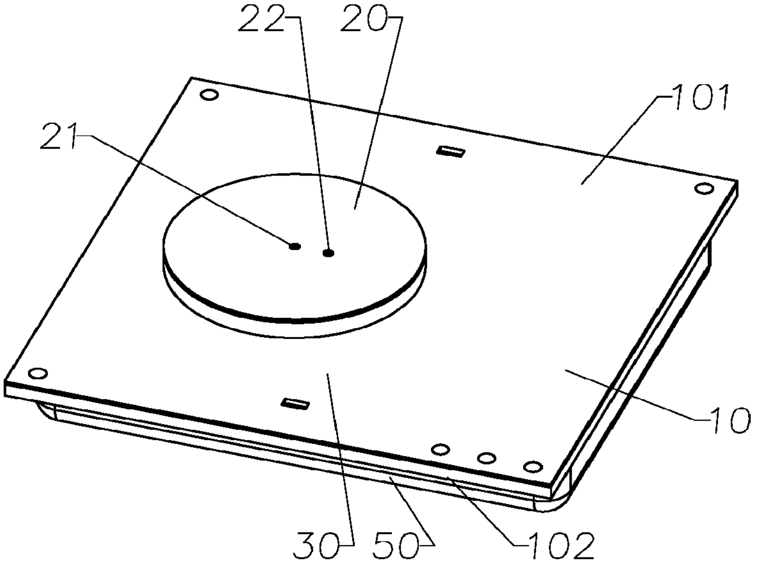
FIG. 4 illustrates a second alternative mode of the antenna according to the above first preferred embodiment of the present invention.
Figure 5:
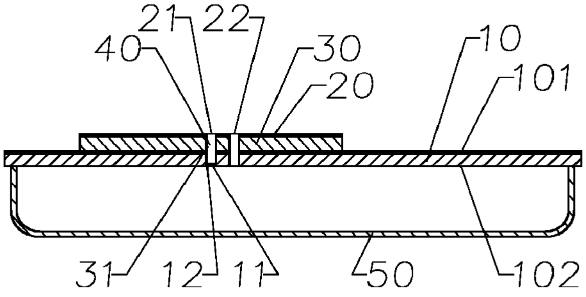
FIG. 5 is a sectional view of the second alternative mode of the antenna according to the above first preferred embodiment of the present invention.
Figure 6:
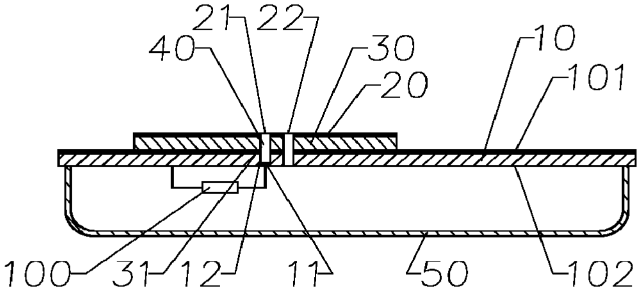
FIG. 6 illustrates a third alternative mode of the antenna according to the above first preferred embodiment of the present invention.

Accordingly, the shape of the radiating source 20 of the antenna should not be limited. For example, the radiating source 20 can be configured to have a rectangular shape as shown in FIGS. 1 to 3. It could be configured to have a square shape as well. Likewise, the radiating source 20 can be configured to have a circular shape or oval shape as shown in FIGS. 4 and 5. In other word, the extension direction of the radiating source 20 is the same as that of the reference ground 10, i.e. the radiating source 20 is parallel to the reference ground 10, to form a flat panel antenna. In other embodiment as shown in FIGS. 7A and 7B, the extension direction of the radiating source 20 is the perpendicular to that of the reference ground 10, i.e. the radiating source 20 is perpendicular to the reference ground 10, to form a column type antenna. As shown in FIGS. 7A and 7B, the antenna further comprises at least a supplement inductor 100, wherein one end of the supplement inductor 100 is electrically connected to the radiating connection point 21 of the radiating source 20 while another end of the supplement inductor 100 is grounded. As shown in FIG. 6, the radiating source 20 is formed as part of the flat panel antenna with the supplement inductor 100, wherein one end of the supplement inductor 100 is electrically connected to the radiating connection point 21 of the radiating source 20 while another end of the supplement inductor 100 is grounded.

Figure 8:
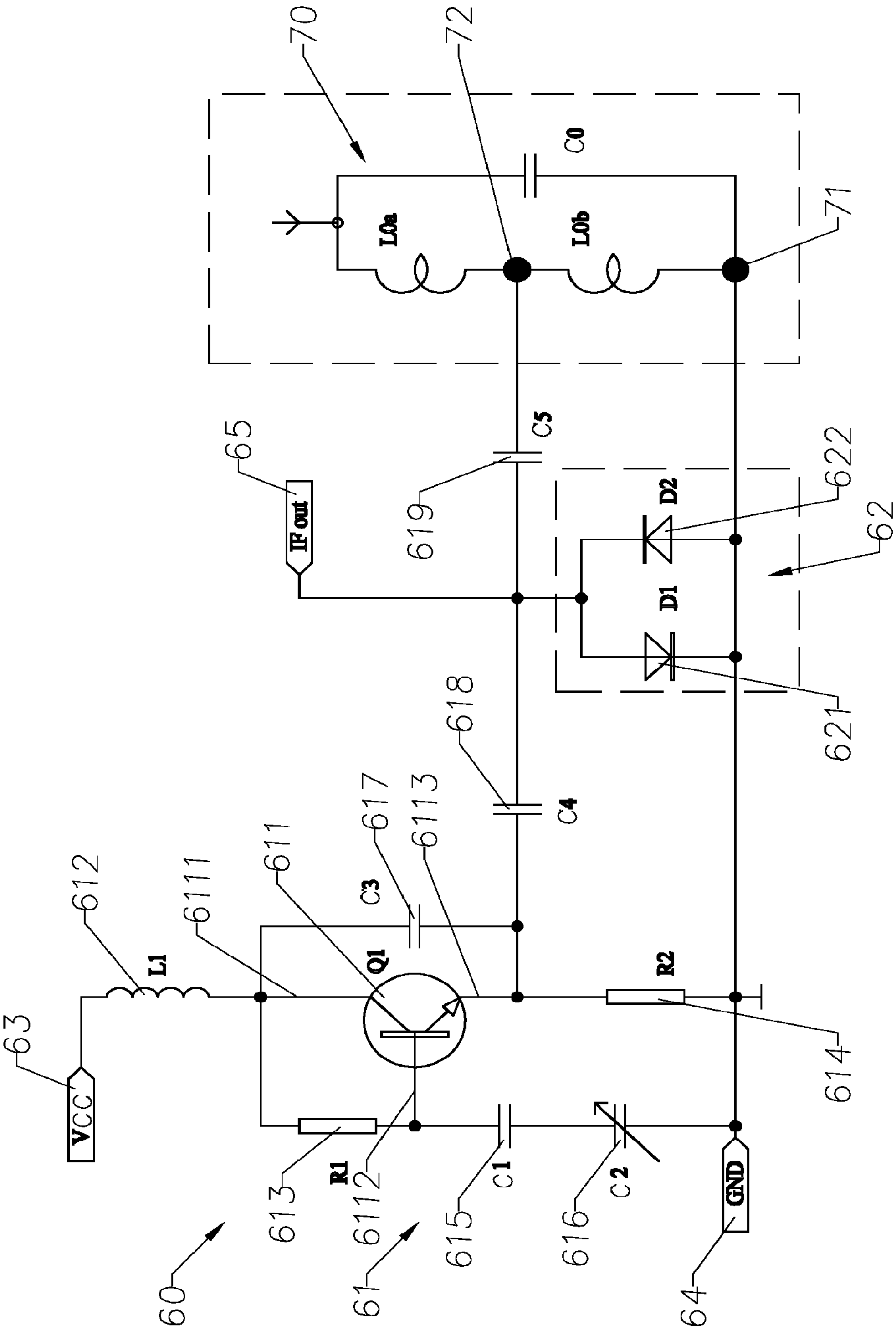
FIG. 8 is an anti-interference circuit diagram of the antenna according to the above first preferred embodiment of the present invention.

As shown in FIG. 8, the antenna further comprises an anti-interference circuit 60 electrically connected to the feed point 22 of the radiating source 20 to enable the excitation current passing through the anti-interference circuit 60 to the feed point 22 of the radiating source 20. The anti-interference circuit 60 has a low impedance to provide the excitation current to match with the low impedance of the antenna so as to enable the antenna generating the initial polarization direction. As a result, the impedance of the antenna will be reduced and the bandwidth of the antenna will be narrowed down such that any interference of electromagnetic wave signals received or generated by the antenna of the present invention will be substantially reduced in response to the nearby electromagnetic radiation frequency or stray radiation frequency of the adjacent frequency bands.

As shown in FIG. 8, the antenna further comprises an analog circuit 70 electrically connected with the radiating source 20 and the reference ground 10 for being excited by the excitation current. As shown in FIG. 8, the analog circuit 70 comprises a first analog point 71 analogously representing to the radiating connection point 21 of the radiating source 20 and a second analog point 72 analogously representing to the feed point 22 of the radiating source 20. It is worth mentioning that the antenna body is excited by the excitation current from the oscillating circuit, it performs as the analog circuit 70 to be excited.

In particular, the anti-interference circuit 60 comprises an oscillation circuit module 61 (i.e. the oscillating circuit) and a mixing detection circuit module 62 electrically connected to the oscillation circuit module 61. Accordingly, the second analog point 72 of the analog circuit 70 is electrically connected to the oscillation circuit module 61 of the anti-interference circuit 60. The mixing detection circuit module 62 is located and retained between the oscillation circuit module 61 and the radiating source 20. The mixing detection circuit module 62 adapts the low-impedance output of the oscillation circuit module 61 and the low impedance of the antenna to be grounded, so as to ensure the stability and reliability of the operation of the antenna. In other words, the feed point 22 of the radiating source 20 is electrically connected to the oscillation circuit module 61 of the anti-interference circuit 60.

Accordingly, once the impedance of the antenna is lowered, its bandwidth will be narrowed to enhance the anti-interference ability. The impedance of the existing antenna can be configured as low as 50 ohms. However, the impedance of the existing antenna cannot be further lowered below 50 ohms because of the conventional oscillating circuit. On the other hand, the oscillation circuit module 61 of the present invention is configured to match with the low impedance antenna in order to further reduce the impedance of the antenna. In other words, the strength of the excitation current for the low impedance antenna will be greater. However, under the emission power regulation of the antenna, the conventional oscillating circuit cannot provide such great excitation current. Therefore, the oscillation circuit module 61 of the present invention must have a low impedance to match with the low impedance antenna.

Accordingly, the anti-interference circuit 60 can be set in the reference ground 10. For example, the anti-interference circuit 60 can be printed or coated on the reference ground 10 or can be etched on the reference ground 10. In other words, the method of forming the anti-interference circuit 60 on the reference ground 10 should not be limited in the present invention.

Preferably, the connection between the oscillation circuit module 61 and the mixing detection circuit module 62 of the anti-interference circuit 60, and the connection between the mixing detection circuit module 62 and the feed point 22 of the radiating source 20 can be the capacitive coupling connections. So, the mixing detection circuit module 62 adapts the low-impedance output of the oscillation circuit module 61 and the low impedance of the antenna to be grounded, to effectively suppress the differential interference from coupling and the common interference from the reception of the antenna, so as to enhance the anti-interference ability of the antenna. It is worth mentioning that the antenna is used for human body movement detection. Due to the Doppler effect, there will be a difference in the wavelengths between the received and transmitted electromagnetic waves. Therefore, it is necessary to distinguish the received and transmitted electromagnetic waves by the mixing detection circuit module 62 to obtain a differential value for the calculation of the related movement data. In other words, the mixing detection circuit module 62 can be disabled when the antenna is used for data transmission.

As shown in FIG. 8, the anti-interference circuit 60 has a low impedance and a relatively large excitation current, that matches with the low impedance of the antenna, to the feed point 22 of the radiating source 20. In particular, the oscillation circuit module 61 of the anti-interference circuit 60 comprises a triode circuit processor 611, an inductor 612, a first resistor 613, a second resistor 614, a first capacitor 615, a second capacitor 616, a third capacitor 617, a fourth capacitor 618 and a fifth capacitor 619. The triode circuit processor 611 comprises a first connection terminal 6111, a second connection terminal 6112, and a third connection terminal 6113. One end of the inductor 612 is electrically connected to a power source VCC 63 while another end of the inductor 612 is electrically connected to the first connection terminal 6111 of the triode circuit processor 611. In other words, the first connection terminal 6111 of the triode circuit processor 611 is electrically connected to a power source VCC 63 through the inductor 612. One end of the first resistor 613 is electrically connected to the first connection terminal 6111 of the triode circuit processor 611 while another end of the first resistor 613 is electrically connected to the second connection terminal 6112 of the triode circuit processor 611. One end of the first capacitor 615 is electrically connected to the second connection terminal 6112 of the triode circuit processor 611 while another end of the first capacitor 615 is electrically connected to one end of the second capacitor 616. Another end of the second capacitor 616 is electrically connected to a ground point 64, such that the second connection terminal 6112 is grounded. In other words, the second connection terminal 6112 of the triode circuit processor 611 is grounded. One end of the third capacitor 617 is electrically connected to the first connection terminal 6111 of the triode circuit processor 611 while another end of the third capacitor 617 is electrically connected to the third connection terminal 6113 of the triode circuit processor 611. One end of the second resistor 614 is electrically connected to the third connection terminal 6113 of the triode circuit processor 611 while another end of the second resistor 614 is electrically connected to the ground point 64. One end of the fourth capacitor 618 is electrically connected to the third connection terminal 6113 of the triode circuit processor 611 while another end of the fourth capacitor 618 is electrically connected to one end of the fifth capacitor 619. Another end of the fifth capacitor 619 is electrically connected to the feed point 22 of the radiating source 20. In other words, the feed point 22 of the radiating source 20 is directly and electrically connected to the third connection terminal 6113 of the triode circuit processor 611. Accordingly, when the reference ground 10 is grounded (i.e. the oscillation circuit module 61 has the zero reference potential), and when the feed point 22 is electrically connected to the oscillation circuit module 61, the antenna body can receive the excitation current to generate the electromagnetic wave signal.

Accordingly, comparing with the conventional oscillation circuit, the first terminal of the triode circuit provides the excitation electrical signal to the feed point 22 of the radiating source 20. As the current is weak, it is difficult to match with the low impendence of the antenna, so that the conventional antenna cannot be excited. It is worth mentioning that the triode circuit processor 611 of the present invention can be a MOS transistor, wherein the third connection terminal 6113 of the triode circuit processor 611 can be the electrode source of the MOS transistor. In other words, the feed point 22 of the radiating source 20 is directly and electrically connected to the electrode source of the MOS transistor. Therefore, the anti-interference circuit 60 can provide a relatively large excitation current to the feed point 22 of the radiating source 20 and to lower the low impedance of the antenna. In another embodiment, the triode circuit processor 611 can be a triode, wherein the third connection terminal 6113 of the triode circuit processor 611 can be the emitter of the triode. In other words, the feed point 22 of the radiating source 20 is directly and electrically connected to the emitter of the triode. Therefore, the anti-interference circuit 60 can provide a relatively large excitation current to the feed point 22 of the radiating source 20 and to lower the low impedance of the antenna.

It should be understood that the present invention provides the excitation current to the radiating source 20 through the third connection terminal 6113 of the triode circuit processor 611. The third connection terminal 6113 of the triode circuit processor 611 is the output terminal thereof. In other words, the current is output at the third connection terminal 6113 of the triode circuit processor 611 to lower the impedance of the oscillation circuit module 61, so as to provide a relatively large excitation current to the feed point 22 of the radiating source 20 and to lower the low impedance of the antenna. Accordingly, the configuration of the anti-interference circuit 60 should not be limited in the present invention.

The mixing detection circuit module 62 comprises a first diode 621 and a second diode 622, wherein one end of the first diode 621 and one end of the second diode 622 are connected to a signal output terminal 65. Another end of the first diode 621 and another end of the second diode 622 are connected to the ground point 64.

Accordingly, the connection among the anti-interference circuit 60, the radiating source 20, and the reference ground 10 prevents any mutual affect among the direct current potentials of the oscillation circuit module 61 of the anti-interference circuit 60, the mixing detection circuit module 62 of the anti-interference circuit 60, and the analog circuit 70, so as to ensure the stability and reliability of the antenna. Thus, by configuring the anti-interference circuit 60 to configure the fifth capacitor 619 between the third capacitor 617 and the fourth capacitor 618 of the oscillation circuit module 61 and the feed point 22 of the radiating source 20, the oscillation circuit module 61, the mixing detection circuit module 62, and the feed point 22 of the radiating source 20 can be capacitive coupling with each other. Therefore, the mixing detection circuit module 62 adapts the low impedance output of the oscillation circuit module 61 and the low impedance of the antenna with respect to the ground, so as to effective suppress the differential interference from the coupling and the common interference from the reception of the antenna. In other words, the anti-interference ability of the antenna will be enhanced.

In addition, according to the antenna of the present invention, the inductor 612 is provided between the first connection terminal 6111 of the triode circuit processor 611 and the power source VCC 63 to further reduce the interference of the oscillation circuit module 61, so as to provide the suitable excitation current to match with the low impedance antenna.

According to the preferred embodiment, the radiating connection point 21 of the radiating source 20 is electrically connected to the reference ground connection point 11 of the reference ground 10 to electrically ground the radiating connection point 21 of the radiating source 20 at the ground point 64. Through such connection, after the excitation current is received at the feed point 22 of the radiating source 20, the inductance characteristics will be generated between the radiating connection point 21 and the feed point 22 of the radiating source 20 to provide a predetermined impedance, such that the antenna is easily initialized at a polarization direction to stably generate the radiate energy in a radial and outward direction. At the same time, the inductance characteristics will be generated between the radiating connection point 21 and the feed point 22 to have a relatively low impedance. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

In other words, when the impedance of the antenna body is reduced, the corresponding bandwidth thereof will be narrowed, such that the frequency of the electromagnetic wave signal generated by the antenna body will be more concentrated within the bandwidth. As a result, the electromagnetic wave signal by the antenna body will prevent being interfered by the nearby electromagnetic radiation frequency or the stray radiation frequency, so as to enhance the anti-interference ability of the antenna. It is worth mentioning that when the impedance of the antenna body is reduced, the amount of the excitation current will be relatively increased. The impedance of the oscillation circuit module 61 will be further reduced to provide the excitation current to the antenna body.

Therefore, by grounding the radiating source 20 and by configuring the distance between the radiating connection point 21 and the feed point 22 of the radiating source 20 being greater than or equal to $\frac{1}{64}\lambda$, the portion between the feed point 22 of the radiating source 20 and the reference ground connection point 11 will be inducted under high frequency excitation current, i.e. the element L0*b* of the analog circuit 70. As a result, the impedance of the antenna body is reduced when the antenna body is excited by the excitation current to generate the electromagnetic wave signal, especially when the reference ground connection point 11 is provided at the physical center point of the radiating source 20.

It is worth mentioning that an inductor can be provided for the antenna body, wherein one end of the inductor is connected to the reference ground connection point 11 and another end of the inductor is grounded. Therefore, the distance between the radiating connection point 21 and the feed point 22 of the radiating source 20 will not be limited. Since the reference ground 10 is grounded, the ground end of the inductor can be grounded by connecting to the reference ground 10.

Figure 9:
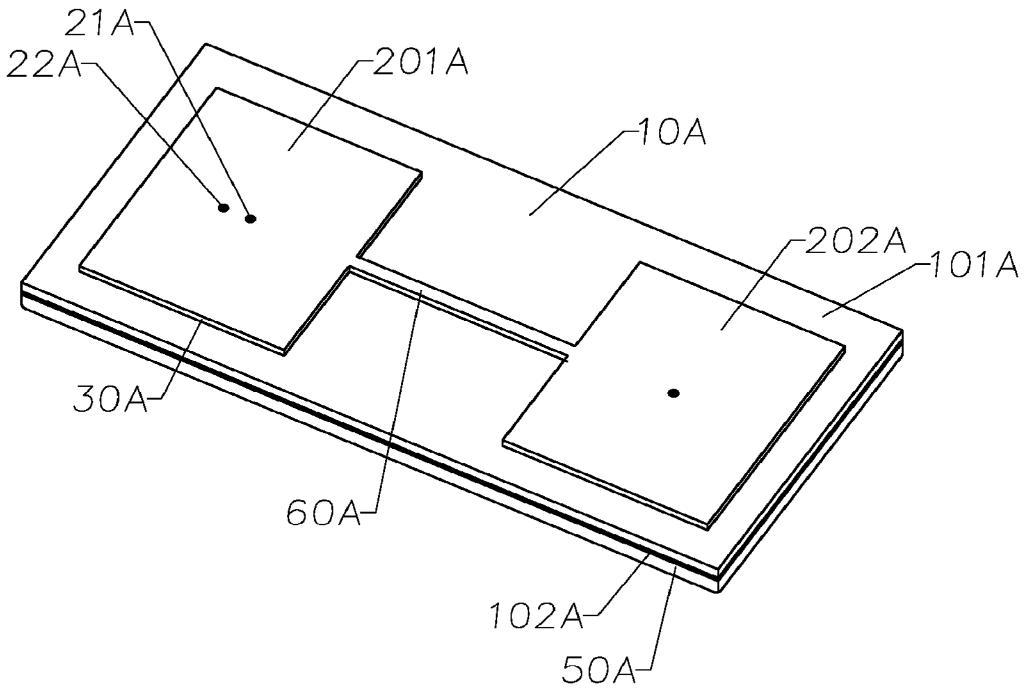
FIG. 9 is a perspective view of an antenna with an anti-interference arrangement according to a second preferred embodiment of the present invention.
Figure 10:
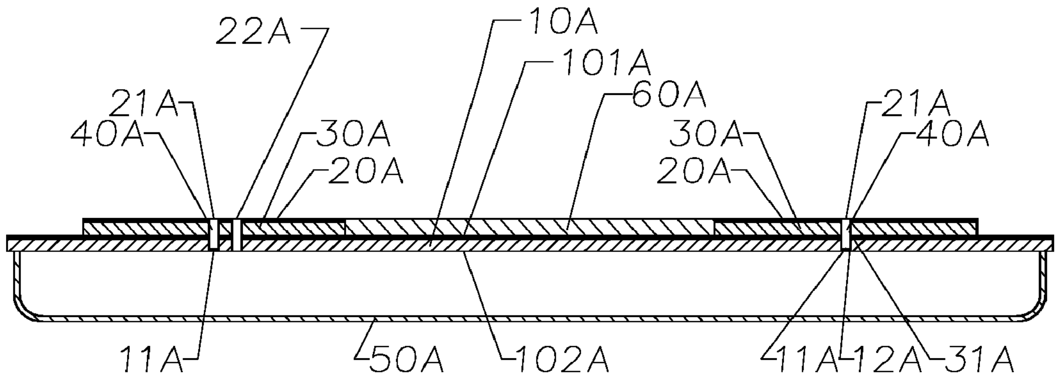
FIG. 10 is a sectional view of the antenna according to the above second preferred embodiment of the present invention.

FIGS. 9 and 10 illustrate a second embodiment of the present invention as an alternative mode thereof, wherein the antenna comprises a reference ground 10A, two radiating sources 20A, and an elongated connector 60A. The two radiating sources 20A are located adjacent to each other and are electrically connected by the elongated connector 60A. The elongated connector 60A is embodied as a micro-connection strip. A radiating clearance 30A is formed at each of the radiating sources 20A and the reference ground 10A.

Accordingly, the reference ground 10A has a first side 101A and an opposed second side 102A, wherein the radiating sources 20A are provided at the first side 101A of the reference ground 10 A.

As shown in FIGS. 9 and 10, each of the radiating sources 20A has at least a radiating connection point 21A. The reference ground 10A has at least two reference ground connection points 11 A. The radiating connection points 21A of the radiating sources 20A are electrically connected to the reference ground connection points 11A of the reference ground 10A respectively. One of the radiating sources 20A has a feed point 22A while another radiating source 20A does not contain any feed point. For easy understanding, the radiating source 20A with the feed point 22A becomes a primary radiating source 201A and the radiating source 20A without the feed point 22A becomes a secondary radiating source 202A as shown in FIGS. 9 and 10. In other words, the primary radiating source 201A and the secondary radiating source 202A are located adjacent to each other. The radiating clearance 30A is formed between the reference ground 10A and each of the primary radiating source 201A and the secondary radiating source 202A. Two ends of the elongated connector 60A are electrically connected to the primary radiating source 201A and the secondary radiating source 202A respectively.

The excitation current is received at the feed point 22A of the primary radiating source 201 A. After the excitation current is received at the feed point 22A of the primary radiating source 201 A, the excitation current passes through the elongated connector 60A to the secondary radiating source 202A. At this time, the antenna is initialized at polarization direction to stably generate the radiate energy in a radial and outward direction through the radiating clearance 30A. Since the primary radiating source 201A and the secondary radiating source 202A are electrically connected with the radiating connection point 21 and the feed point 22 to provide a predetermined impedance after the excitation current is received at the feed point 22A of the primary radiating source 201A and is sent to the secondary radiating source 202A through the elongated connector 60A. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

Preferably, a distance between the feed point 22A and the radiating connection point 21A of the primary radiating source 201A is greater than or equal to $\frac{1}{64}\lambda$, where $\lambda$ is the wavelength of the electromagnetic wave signal received or generated by the antenna. Under the excitation of the electromagnetic wave signal, the electromagnetic wave signal will generate the inductance characteristics between the feed point 22A and the radiating connection point 21A of the primary radiating source 201A. Since the feed point 22A of the primary radiating source 201A is deviated from the physical center point thereof, the intensity required for the excitation current of the antenna to the electromagnetic wave signal will be substantially reduced. As a result, once the excitation current is received by the feed point 22A of the primary radiating source 201A, the antenna is easily initialized at a polarization direction.

Preferably, the radiating connection point 21A of the primary radiating source 201A is defined as the physical center point thereof. In other words, the physical center point of the primary radiating source 201A is electrically connected to the reference ground 10A to ground the primary radiating source 201A. Therefore, a distance between the periphery of primary radiating source 201A and the radiating connection point 21A thereof is preset. Correspondingly, the radiating connection point 21A of the secondary radiating source 202A is defined as the physical center point thereof, wherein the physical center point of the secondary radiating source 202A is electrically connected to the reference ground 10A, such that a distance between the periphery of secondary radiating source 202A and the radiating connection point 21A thereof is preset. Therefore, the antenna can evenly and stably generate the radiate energy via the primary radiating source 201A and the secondary radiating source 202A in a radial and outward direction after the initial polarization direction is generated. Under the excitation of the electromagnetic wave signal and through the electrical connection among the reference ground 10A and the physical center points of the primary radiating source 201A and the secondary radiating source 202A, when the excitation current is received by the feed point 22A of the primary radiating source 201A to the secondary radiating source 202A through the elongated connector 60A, the antenna can evenly and stably generate the radiate energy via the primary radiating source 201A and the secondary radiating source 202A in a radial and outward direction. At the same time, the inductance characteristics will be generated between the feed point 22A and the radiating connection point 21A of the primary radiating source 201A and the inductance characteristics will be generated between the elongated connector 60A and the radiating connection point 21A of the secondary radiating source 202A to lower the impedance of the antenna. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

As shown in FIGS. 9 and 10, the antenna further comprises at least two electrical connection elements 40A, wherein one of the electrical connection elements 40A has two terminal ends electrically connecting with the radiating connection point 21A of the primary radiating source 201A and one of the reference ground connection points 11A of the reference ground 10A respectively. Therefore, the electrical connection element 40A forms an electrical connection media to electrically connect the primary radiating source 201A and the reference ground 10A with each other so as to ground the primary radiating source 201 A. Another electrical connection element 40A has two terminal ends electrically connecting with the radiating connection point 21A of the secondary radiating source 202A and another reference ground connection point 11A of the reference ground 10A respectively. Therefore, the electrical connection element 40A forms an electrical connection media to electrically connect the secondary radiating source 202A and the reference ground 10A with each other so as to ground the secondary radiating source 202A.

Preferably, there are at least two radiating connection points 21A provided by at least one of the primary radiating source 201A and the secondary radiating source 202A. In one embodiment, for example, the primary radiating source 201A provides two or more radiating connection points 21A while the secondary radiating source 202A provides one radiating connection point 21A. The physical center point of the primary radiating source 201A is surrounded by the radiating connection points 21A of the primary radiating source 201A. The radiating connection point 21A of the secondary radiating source 202A is the physical center point thereof. In another embodiment, the primary radiating source 201A provides one radiating connection point 21A while the secondary radiating source 202A provides two or more radiating connection point 21A. The radiating connection point 21A of the primary radiating source 201A is the physical center point thereof. The physical center point of the secondary radiating source 202A is surrounded by the radiating connection points 21A of the secondary radiating source 202A. In another further embodiment, the primary radiating source 201A provides two or more radiating connection points 21A while the secondary radiating source 202A provides two or more radiating connection point 21A. The physical center point of the primary radiating source 201A is surrounded by the radiating connection points 21A of the primary radiating source 201 A. The physical center point of the secondary radiating source 202A is surrounded by the radiating connection points 21A of the secondary radiating source 202A.

As shown in FIGS. 9 and 10, the antenna further comprises a shield member 50A coupled at the reference ground 10A at the second side 102A thereof.

Figure 11:
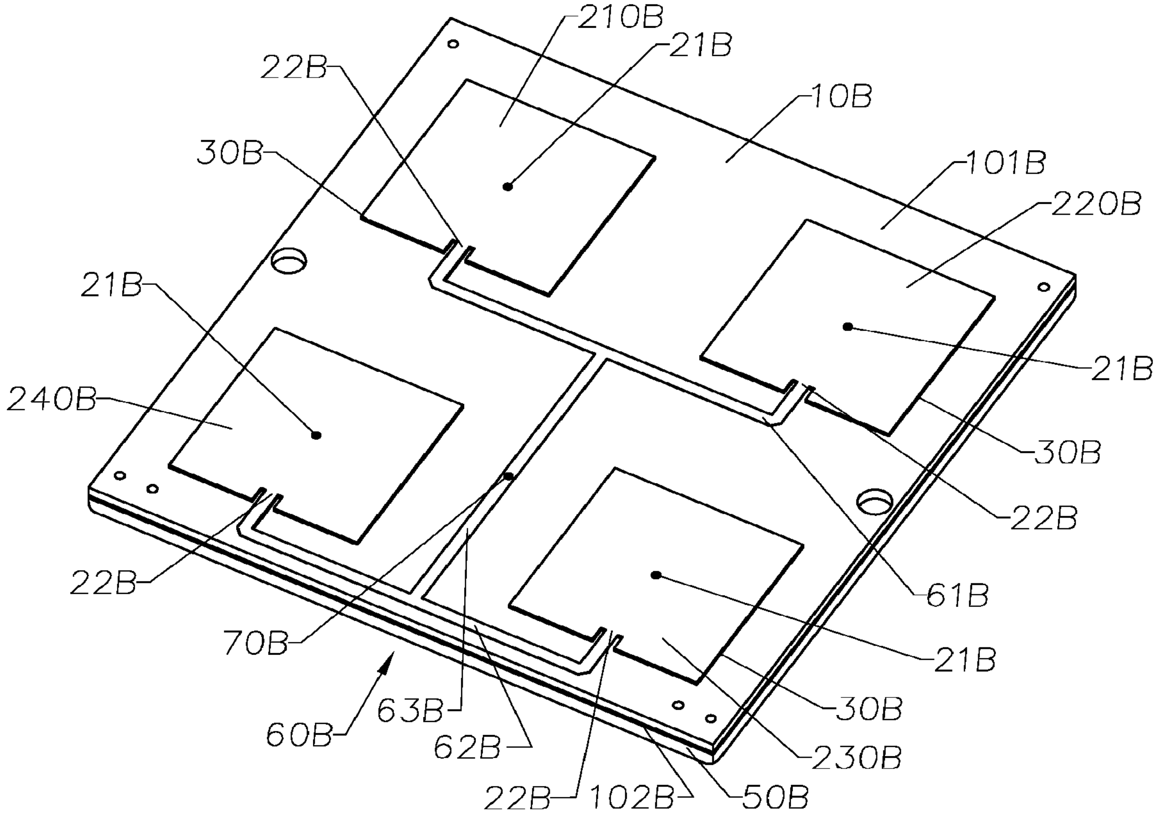
FIG. 11 is a perspective view of an antenna with an anti-interference arrangement according to a third preferred embodiment of the present invention.
Figure 12:
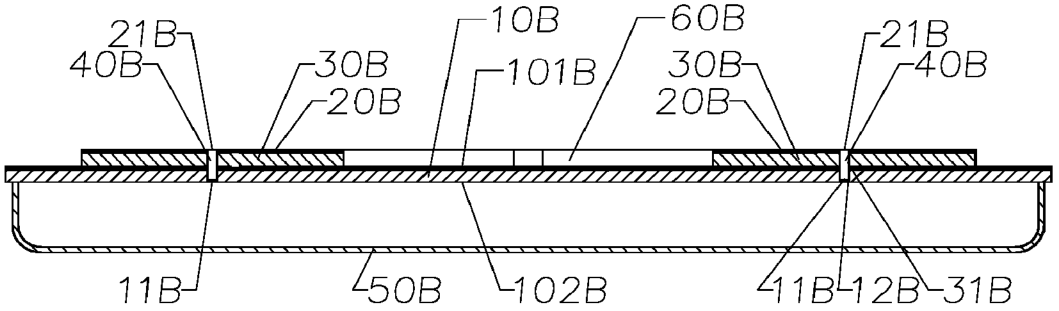
FIG. 12 is a sectional view of the antenna according to the above third preferred embodiment of the present invention.

FIGS. 11 and 12 illustrate a third embodiment of the present invention as another alternative mode thereof, wherein the antenna comprises a reference ground 10B, four radiating sources 20B, and three elongated connectors 60B. The reference ground 10B has a first side 101B and an opposed second side 102B. The four radiating sources 20B are formed in pair and are located adjacent to each other on the first side 101B of the reference ground 10B. The elongated connector 60A is embodied as a micro-connection strip. A radiating clearance 30B is formed at each of the radiating sources 20B and the reference ground 10A. The first elongated connectors 60B has two ends connecting to two adjacent radiating sources 20B in pair. The second elongated connector 60B has two ends connecting to two adjacent radiating sources 20B in another pair. The third elongated connector 60B has two ends connecting between the first and second elongated connectors 60B.

According to the preferred embodiment, the four radiating sources 20B are defined as a first radiating source 210B, a second radiating source 220B, a third radiating source 23 0B, and a fourth radiating source 240B. The first through fourth radiating sources 210B, 220B, 230B, 240B are orderly located in a clockwise direction. Therefore, the first radiating source 210B is located adjacent to the second and fourth radiating sources 220B, 240B. The third radiating source 230B is located adjacent to the second and fourth radiating sources 220B, 240B. The first radiating source 210B is located opposite to the third radiating source 230B. The second radiating source 220B is located opposite to the fourth radiating source 240B. In addition, the radiating clearance 30B is formed between the first radiating source 210B and the reference ground 10B. The radiating clearance 30B is also formed between the second radiating source 220B and the reference ground 10B. The radiating clearance 30B is also formed between the third radiating source 230B and the reference ground 10B. The radiating clearance 30B is also formed between the fourth radiating source 240B and the reference ground 10B. As it is mentioned above, the three elongated connectors 60B are defined as the first elongated connector 61B, the second elongated connector 62B, and the third elongated connector 63B. The two ends of the first elongated connector 61B are electrically connected to the first and second radiating sources 210B, 220B respectively. The two ends of the second elongated connector 62B are electrically connected to the third and fourth radiating sources 230B, 240B respectively. The two ends of the third elongated connector 63B are electrically connected to the first and second elongated connectors 61B, 62B.

As shown in FIGS. 11 and 12, the first through fourth radiating sources 210B, 220B, 230B, 240B are correspondingly connected to the reference ground 10B, wherein when the excitation current is received by the first through fourth radiating sources 210B, 220B, 230B, 240B, the antenna is initialized at a polarization direction to enable the electromagnetic wave signals received or generated by the antenna.

As shown in FIGS. 11 and 12, each of the first through fourth radiating sources 210B, 220B, 230B, 240B has at least a radiating connection point 21B. The reference ground 10B has at least four reference ground connection points 11A electrically connected to the first through fourth radiating sources 210B, 220B, 230B, 240B respectively.

Each of the first through fourth radiating sources 210B, 220B, 230B, 240B has a feed point 22B to receive the excitation current. Preferably, a distance between the feed point 22B and the radiating connection point 21B of any one of the first through fourth radiating sources 210B, 220B, 230B, 240B is greater than or equal to $\frac{1}{64}\lambda$, where $\lambda$ is the wavelength of the electromagnetic wave signal received or generated by the antenna. Under the excitation of the electromagnetic wave signal, the electromagnetic wave signal will generate the inductance characteristics between the feed point 22B and the radiating connection point 21B of one of the first through fourth radiating sources 210B, 220B, 230B, 240B to provide a predetermine of impedance. The antenna is initialized at a polarization direction to stably generate the radiate energy in a radial and outward direction. At the same time, the inductance characteristics will be generated between the feed point 22B and the radiating connection point 21B and the inductance characteristics will be generated between the elongated connector 60A to lower the impedance of the antenna. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

Furthermore, the feed point 22B of the corresponding radiating source 20B is deviated from a physical center point thereof to lower the amount or intensity of the excitation current for the antenna. In addition, when the excitation current is received by the feed point 22B of the first radiating source 210B, the feed point 22B of the second radiating source 220B, the feed point 22B of the third radiating source 230B, and the feed point 22B of the fourth radiating source 240B, the antenna is easily initialized at a polarization direction.

Preferably, the feed point 22B of the first radiating source 210B is the connection point to connect to the first elongated connector 61B. The feed point 22B of the second radiating source 220B is the connection point to connect to the first elongated connector 61B. The feed point 22B of the third radiating source 230B is the connection point to connect to the second elongated connector 62B. The feed point 22B of the fourth radiating source 240B is the connection point to connect to the second elongated connector 62B.

Furthermore, the antenna further comprises an antenna feed point 70B electrically connected to the third elongated connector 63B. When the excitation current is received at the antenna feed point 70B of the antenna, it passes through the third elongated connector 63B to the feed points 22B of the first through fourth radiating sources 210B, 220B, 230B, 240B via the first and second elongated connectors 61B, 62B. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

In addition, when the first radiating source 210B has one radiating connection point 21B, the radiating connection point 21B of the first radiating source 210B is defined as the physical center point thereof. When the first radiating source 210B has two or more radiating connection points 21B, the physical center point of the first radiating source 210B is surrounded by the radiating connection points 21B thereof. When the second radiating source 220B has one radiating connection point 21B, the radiating connection point 21B of the second radiating source 220B is defined as the physical center point thereof. When the second radiating source 220B has two or more radiating connection points 21B, the physical center point of the second radiating source 220B is surrounded by the radiating connection points 21B thereof. When the third radiating source 230B has one radiating connection point 21B, the radiating connection point 21B of the third radiating source 23 0B is defined as the physical center point thereof. When the third radiating source 230B has two or more radiating connection points 21B, the physical center point of the third radiating source 230B is surrounded by the radiating connection points 21B thereof. When the fourth radiating source 240B has one radiating connection point 21B, the radiating connection point 21B of the fourth radiating source 240B is defined as the physical center point thereof. When the fourth radiating source 240B has two or more radiating connection points 21B, the physical center point of the fourth radiating source 240B is surrounded by the radiating connection points 21B thereof.

As shown in FIGS. 11 and 12, the antenna further comprises at least four electrical connection elements 40B, wherein at least one of the electrical connection elements 40B has two terminal ends electrically connecting with the radiating connection point 21B of the first radiating source 210B and the reference ground connection point 11B of the reference ground 10B respectively, so as to electrically connect the first radiating source 210B with the reference ground 10B. At least one of the electrical connection elements 40B has two terminal ends electrically connecting with the radiating connection point 21B of the second radiating source 220B and the reference ground connection point 11B of the reference ground 10B respectively, so as to electrically connect the second radiating source 220B with the reference ground 10B. At least one of the electrical connection elements 40B has two terminal ends electrically connecting with the radiating connection point 21B of the third radiating source 230B and the reference ground connection point 11B of the reference ground 10B respectively, so as to electrically connect the third radiating source 230B with the reference ground 10B. At least one of the electrical connection elements 40B has two terminal ends electrically connecting with the radiating connection point 21B of the fourth radiating source 240B and the reference ground connection point 11B of the reference ground 10B respectively, so as to electrically connect the fourth radiating source 240B with the reference ground 10B.

As shown in FIGS. 11 and 12, the antenna further comprises a shield member 50B coupled at the reference ground 10B at the second side 102B thereof.

It is appreciated that different components (elements) as described in the above first, second, third and fourth naming elements should not have any distinguish between different parts, elements, and structures of the present invention. Unless it is specified otherwise, the order or the number of the component should not be limited. Specifically, in this specific example of the antenna shown in FIGS. 11 and 12, the first radiating source 210B, the second radiating source 220B, the third radiating source 230B and the fourth radiating source 240B are only used to describe different locations of the radiation source 20B at different positions of the present invention, which does not refer to the order or the number of the radiation sources 20B.

Figure 13:
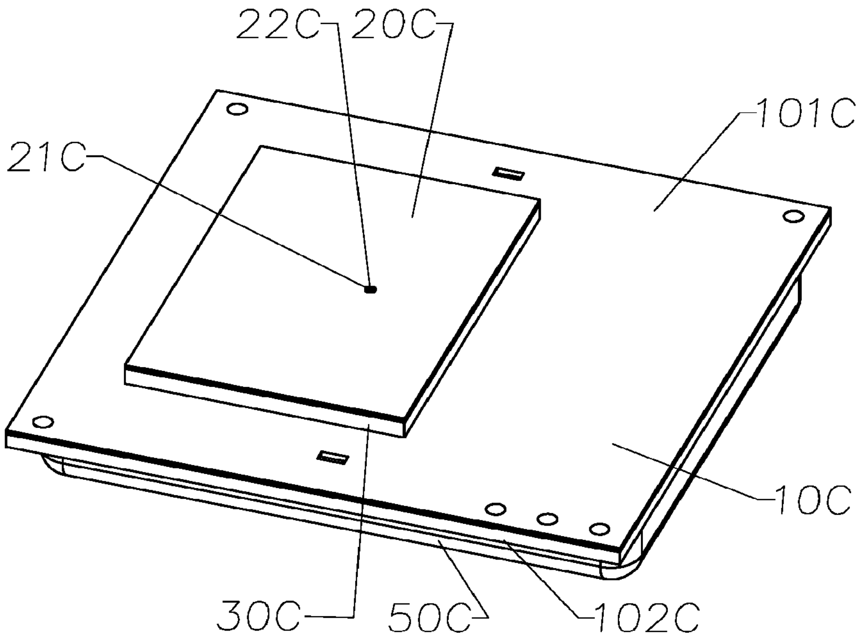
FIG. 13 is a perspective view of an antenna with an anti-interference arrangement according to a fourth preferred embodiment of the present invention.
Figure 14:
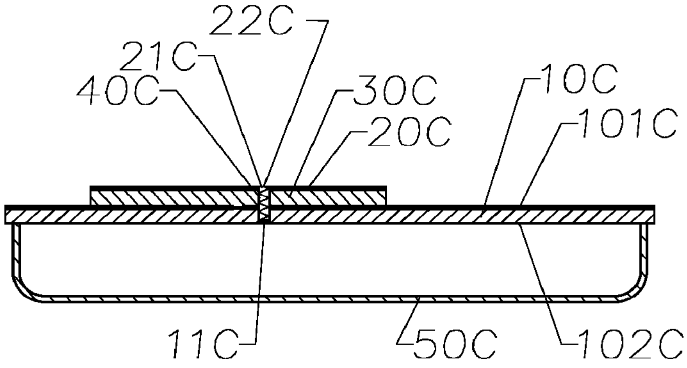
FIG. 14 is a sectional view of the antenna according to the above fourth preferred embodiment of the present invention.

FIGS. 13 and 14 illustrate the fourth embodiment of the present invention as another alternative mode thereof, wherein the antenna comprises a reference ground 10C and at least a radiating source 20C. The radiating source 20C is disposed adjacent to the reference ground 10C to define a radiating clearance 30C between the radiating source 20C and the reference ground 10C. Accordingly, at least one radiating source 20C is electrically connected to the reference ground 10C.

In particular, the reference ground 10C has a first side 101C and an opposed second side 102C, wherein the radiating source 20C is disposed at the first side 101C of the radiating source 20C.

As shown in FIGS. 13 and 14, the radiating source 20C has one radiating connection point 21C and a feed point 22C, wherein the radiating connection point 21C is overlapped with the feed point 22C. The reference ground 10C has at least one reference ground connection point 11C. The antenna further comprises at least an electrical connection element 40B, wherein the electrical connection element 40B preferably is an inductor. The electrical connection element 40C has two terminal ends electrically connecting with the radiating connection point 21C of the radiating source 20C and the reference ground connection point 11C of the reference ground 10C respectively, so as to electrically connect the radiating source 20C with the reference ground 10C via the electrical connection element 40C. For example, the electrical connection element 40C, can be, but not limited to, a curved connection type inductor or a threaded connection type inductor. After the excitation current is received at the feed point 22C of the radiating source 20C, the antenna is initialized at a polarization direction at the radiating source 20C to stably generate the radiate energy in a radial and outward direction. Since the radiating source 20C is electrically connected to the reference ground 10C by the electrical connection element 40C, the impedance of the antenna will be lowered after the excitation current is received at the feed point 22C of the radiating source 20C. Therefore, the bandwidth of the antenna will be narrowed down to prevent the electromagnetic wave signals received or generated by the antenna from being interfered by the nearby electromagnetic radiation frequency or the stray radiation frequency, so as to enhance the anti-interference ability of the antenna.

Figure 15:
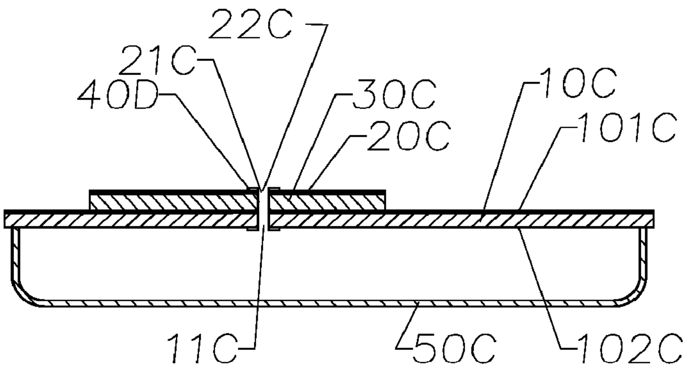
FIG. 15 illustrates an alternative mode of the antenna according to the above fourth preferred embodiment of the present invention.

Alternatively, the radiating source 20C and the reference ground 10C are electrically connected with each other via the electrical connection element 40D, wherein a slot is formed at the reference ground 10C and a metal layer is formed at a wall of the slot to form a metallization slot as the electrical connection element 40D to electrically connect the radiating source 20C with the reference ground 10C as shown in FIG. 15. It is worth mentioning that the feed point of the antenna is electrically connected to the oscillating circuit by the electrical connection element 40D.

According to the preferred embodiment, the present invention further comprises a method of manufacturing the antenna, which comprises the following steps.

(a) Form the radiating clearance 30 between the radiating source 20 and the reference ground 10, wherein the radiating source 20 is spacedly disposed at the first side 101 of the reference ground 10.

(b) Ground the radiating source 20 to form the antenna.

Accordingly, in the step (b), the radiating source 20 is electrically connected to the reference ground 10, such that the radiating source 20 is grounded.

It is worth mentioning that the step (b) can be performed prior to the step (a). In other words, the radiating source 20 is electrically connected to the reference ground 10 first and then the radiating source 20 is spacedly retain at the first side 101 of the reference ground 10.

In the step (a), a solid media is placed on the first side 101 of the reference ground 10, wherein the radiating source 20 is then disposed on the solid media to spacedly retain the radiating source 20 at the reference ground 10 so as to form the radiating clearance 30 between the radiating source 20 and the reference ground 10. Alternatively, the solid media can be placed at the radiating source 20, wherein the solid media is then disposed on the first side 101 of the reference ground 10 to spacedly retain the radiating source 20 at the reference ground 10 so as to form the radiating clearance 30 between the radiating source 20 and the reference ground 10.

The present invention further provides an anti-interference method for the antenna which comprises the steps of: grounding the radiating source 20 to reduce an internal impedance of the antenna; and receiving the excitation current at the feed point 22 of the radiating source 20 to narrow the bandwidth of the antenna, such that any interference of electromagnetic wave signals received or generated by the antenna of the present invention will be substantially reduced in response to the nearby electromagnetic radiation frequency or stray radiation frequency of the adjacent frequency bands.

Referring to FIGS. 16A to 18, according to the above first to fourth preferred embodiments of the antenna with anti-interference arrangement, various embodying arrangements and distributions of the at least one radiating connection point 21 and the at least one feed point 22 are illustrated.

Figure 18:
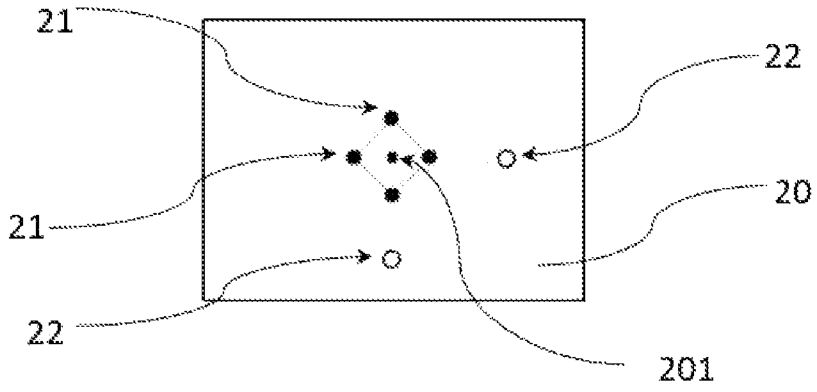
FIG. 18 is a schematic view illustrating an example of distribution of the feed points and the radiating connection points with respect to the physical center point of the radiating source of the antenna with anti-interference arrangement according to the above preferred embodiments of the present invention.

Referring to FIG. 18, the at least one radiating source 20 has at least one feed point 22 and at least one radiating connection point 21, wherein the at least one feed point 22, which is arranged to be connected to an excitation current and the oscillating circuit to generate the electromagnetic wave signal (microwave excitation electrical signal), deviates from a physical center point 201 of the at least one radiation source 20.

Figure 16A:
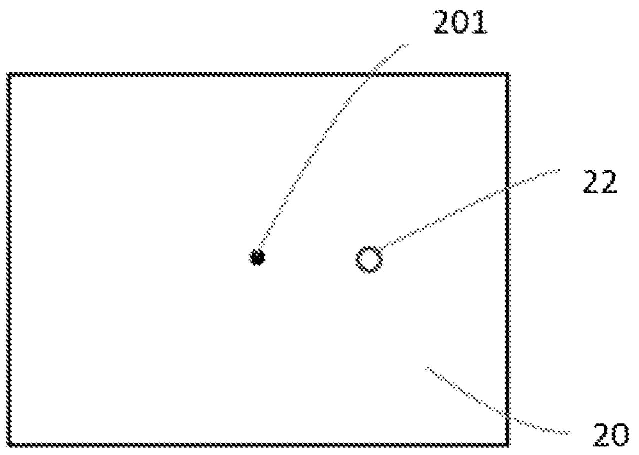
FIGS. 16A to 16E are schematic views illustrating distributions of one or more feed points with respect to a physical center point of a radiating source of the antenna with anti-interference arrangement according to the above preferred embodiments of the present invention.

FIGS. 16A to 16E are schematic views of the radiating source 20 having a physical center point 201 and illustrating the distribution of one or more feed points 22. As shown in FIG. 16A, the feed point 22 is deviated from the physical center point 201 of the radiating source 20 for a predetermined distance.

Figure 16B:
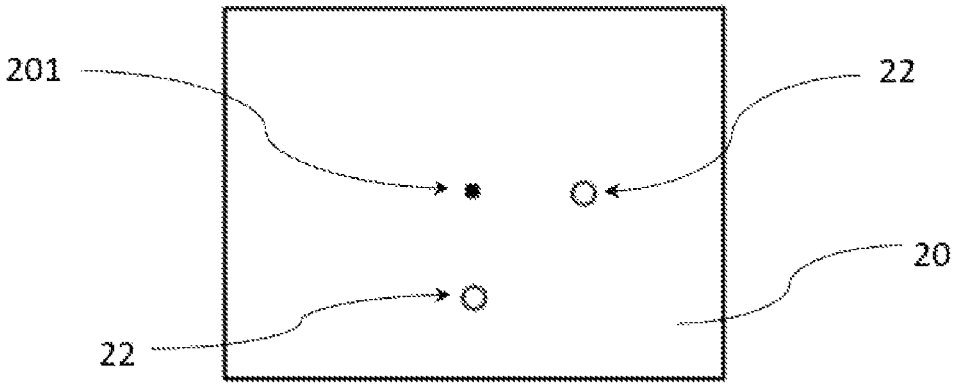

As shown in FIG. 16B, the antenna provides two feed points 22 arranged in a such a manner that connection lines between the two feed points 22 to the physical center point 201 of the at least one radiating source 20 are perpendicular with each other, i.e. one of the two feed points 22 is arranged on a top side or a bottom side of the physical center point 201 of the radiating source 20 with a predetermined distance therebetween while another one of the two feed points 22 is arranged on a left side or a right side of the physical center point 201 of the radiating source 20 with the same predetermined distance therebetween.

Figure 16C:
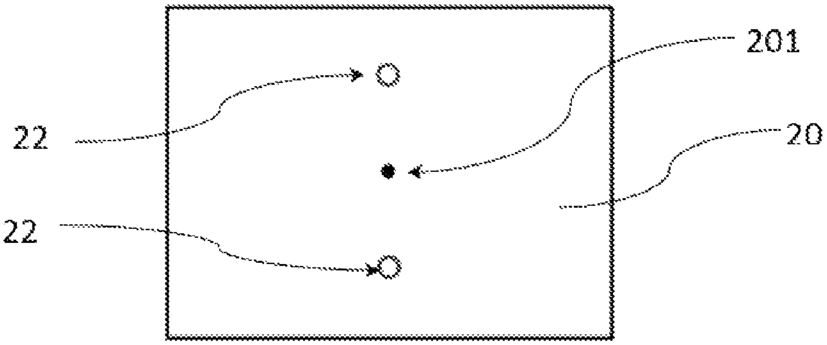

As shown in FIG. 16C, the antenna provides two feed points 22 which are arranged in such a manner that two connection lines between the two feed points 22 to the physical center point 201 of the at least one radiating source 20 are aligned straightly, i.e. the two feed points 22 are arranged on a top side and a bottom side of the physical center point 201 respectively with the same predetermined distance therebetween.

Figure 16D:
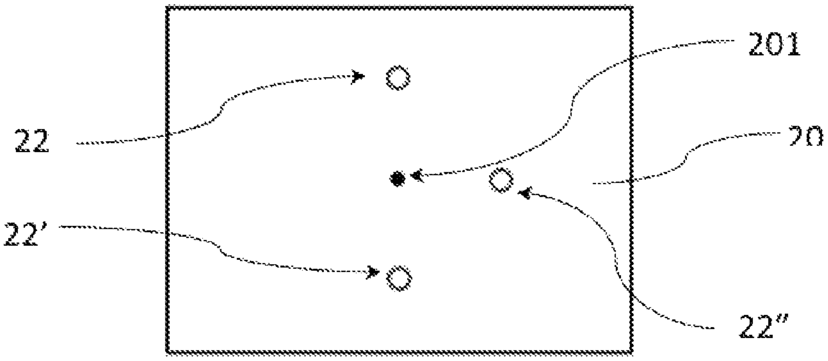

As shown in FIG. 16D, the antenna provides three feed points 22, 22', 22", namely a first feed point 22, a second feed point 22' and a third feed point 22", wherein the first feed point 22 and the second feed point 22' are symmetrically distributed at the radiating source 20 with respect to the physical center point 201 of the radiating source 20, while a third feed point 22" of the three feed points is arranged in such a manner that a connecting line between the third feed point 22" and the physical center point 201 of the radiating source 20 is perpendicular to a connecting line between the first and the second feed points 22, 22' of the three feed points.

Figure 16E:
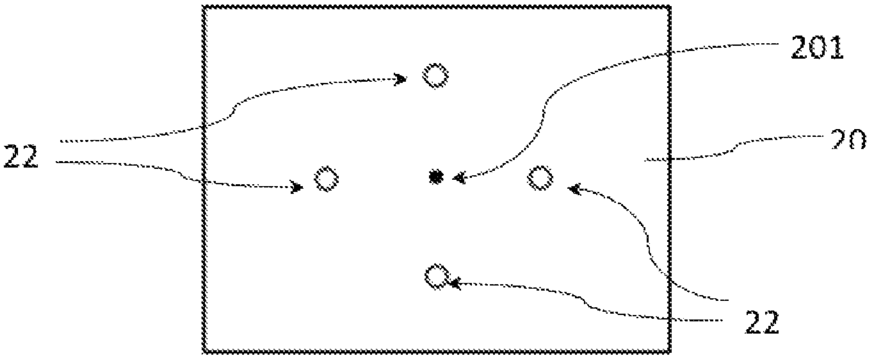

As shown in FIG. 16E, the antenna provides four feed points 22, wherein each of the four feed points 22 is distributed at an equal angle around the physical center point 201 of the at least one radiating source 20 while an equal distance is arranged between each of the four feed points 22 with the physical center point 201 of the at least one radiating source 20 which is electrically connected to the reference ground 10.

Accordingly, according to the present invention, the antenna provides at least two feed points 22 distributed at the at least one radiating source 20 around the physical center point 201 thereof evenly and symmetrically, wherein the radiating source 20 is arranged in such a manner that the at least two feed points 22 are connected for at least two excitation signals with opposite phases so as to enable the at least two feed points 22 to be distributed in symmetrical form with respect to the physical center point 201 to strengthen the zero potential characteristic of the physical center point 201 of the radiating source 20.

Alternatively, the antenna provides at least two feed points 22 distributed at the at least one radiating source 20, wherein each of the feed points 22 can be fed with excitation signals and emit electromagnetic waves, or receive electromagnetic waves, including the reflecting waves generated and reflected from the object that the emitted electromagnetic waves encountered.

In addition, according to the present invention, the at least two feed points 22 of the antenna distributed at the at least one radiating source 20 may include a first feed point 22 configured to emit electromagnetic waves and a second feed point 22 configured to receive electromagnetic waves while the first and second feed points 22 have a predetermined distance therebetween and are preferably arranged perpendicularly.

It is appreciated that each of the at least two feed points 22 distributed at the at least one radiating source 20 of the antenna according to the present invention has a polarization direction (i.e. the direction from the feed point 22 to the physical center point 201 of the radiating source 20) arranged in perpendicular manner with respect to the physical center point 201 of the radiating source 20, so as to respectively receive at least two excitation signals with a phase difference of 90 degrees to form the antenna with circular polarization, or alternatively, one of the at least two feed points 22 is configured for receiving excitation signals and another one of the at least two feed points 22 is configured for receiving the corresponding feedback signals so as to enable the antenna achieving a certain degree of isolation of transceiver separation.

In view of the various distribution examples as described above and shown in FIGS. 16A to 16E, the antenna of the present invention provides one or more feed points 22 arranged on the at least one radiating source 20 each having an equal angle around the physical center point 201 of the radiating source 20 and an equal distance from the physical center point 201 of the radiating source 20 and one or more radiating connection points 21 arranged on the radiating source 20 as illustrated in FIGS. 17A to 17H.

Regarding the arrangement of the radiating connecting points 21 of the radiating source 20, please referring to FIGS. 17A to 17H, according to the present invention, a same set of radiating connection points 21 are respectively positioned at vertices of a regular polygon having a center point which is the physical center point 201 of the at least one radiating source 20, wherein the radiating connection points 21 of the same set of radiating connection points are arranged to each having an equal distance with respect to the physical center point 201 of the corresponding radiating source 20 and distributed around the physical center point 201 of the corresponding radiating source 20 with equal angle therebetween.

As described in the above preferred embodiments, the at least one radiating source 20 is electrically connected to the reference ground 10 at the radiating connection points 21 of the at least one radiating source 20 so as to feed in excitation signals at the at least one feed point 22 of the at least one radiating source 20, wherein since the at least one radiating source 20 is electrically connected with the reference ground 10 at the radiating connection points 21, a zero potential point is formed at the physical center point 201 of the at least one radiating source 20 and an equivalent connection with the reference ground so as to narrowing a bandwidth of the antenna.

Figure 17A:
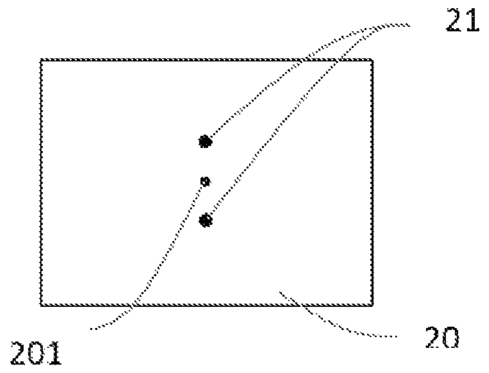
FIGS. 17A to 17H are schematic views illustrating distribution of the radiating connection points with respect to the physical center point of the radiating source of the antenna with anti-interference arrangement according to the above preferred embodiments of the present invention.

As shown in FIG. 17A, a same pair of radiating connection points 21 are symmetrically distributed at the at least one radiating source 20 with respect to the physical center point 201 of the at least one radiating source 20, wherein in correspondence to connection lines between the same pair of the radiating connection points 21 and a center point which is the physical center point 201 of the at least one radiating source 20, wherein two connection lines between the two radiating connection points 21 to the physical center point 201 of the at least one radiating source 20 are aligned straightly, i.e. the two radiating connection points 21 are arranged on a top side and a bottom side of the physical center point 201 respectively with the same predetermined distance therebetween.

Figure 17B:
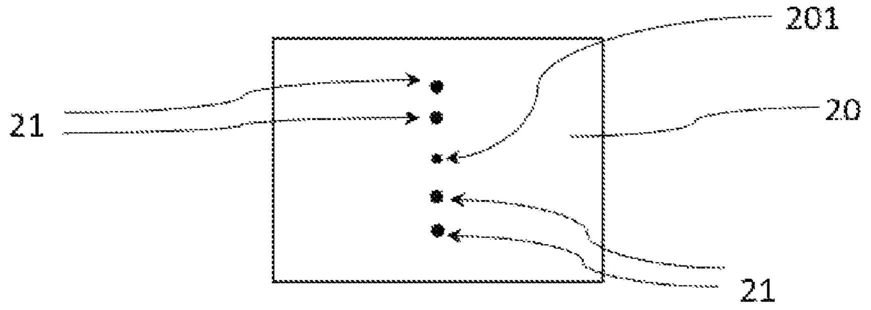

As shown in FIG. 17B, two pair of radiating connection points 21 are symmetrically distributed on two sides of the physical center point 201 of the at least one radiating source 20 symmetrically, wherein connection lines between the four radiating connection points 21 to the physical center point 201 of the at least one radiating source 20 are aligned straightly, i.e. two radiating connection points 21 are aligned at a top side and two radiating connection points 21 are aligned at a bottom side of the physical center point 201 respectively with the same predetermined distance therebetween.

FIGS. 17C to 17H illustrates further various arrangement of the radiating connection points 21 with respect to the physical center point 201 of the at least one radiating source 20, wherein the connecting lines between the radiating connection points 21 are merely for illustration purpose to show the equal distance between the two adjacent radiating connection points 21 but not an element actually provided on the radiating source 20.

Figure 17C:
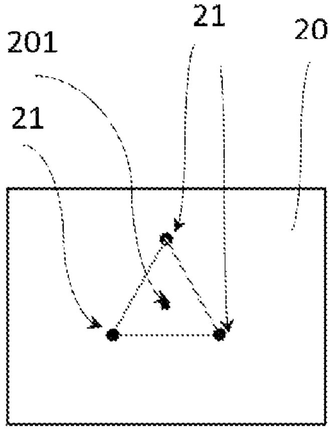

As shown in FIG. 17C, the set of radiating connection points 21 has three radiating connection points 21 which are respectively positioned at vertices of a triangle which center point is positioned at the physical center point 201 of the radiating source 20, wherein the radiating connection points 21 of the same set of three radiating connection points 21 are arranged to each having an equal distance with respect to the physical center point 201 of the corresponding radiating source 20 and distributed around the physical center point 201 of the corresponding radiating source 20 with equal angle therebetween.

Figure 17D:
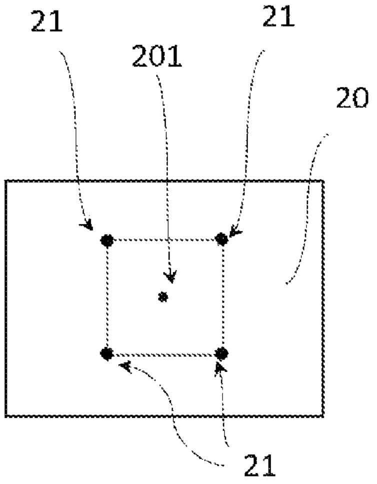

As shown in FIG. 17D, the set of radiating connection points 21 has four radiating connection points 21 which are respectively positioned at vertices of a square which center point is positioned at the physical center point 201 of the radiating source 20, wherein the radiating connection points 21 of the same set of four radiating connection points 21 are arranged to each having an equal distance with respect to the physical center point 201 of the corresponding radiating source 20 and distributed around the physical center point 201 of the corresponding radiating source 20 with equal angle therebetween.

Figure 17E:
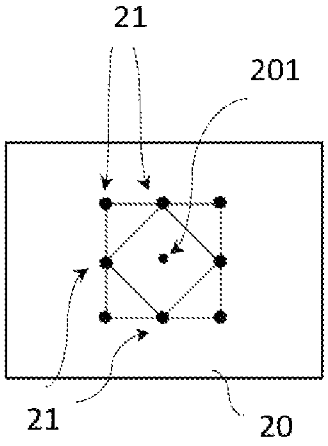

As shown in FIG. 17E, two sets of radiating connection points 21 having eight radiating connection points 21 are respectively positioned at vertices of two squares which center points are positioned at the physical center point 201 of the radiating source 20, wherein the four radiating connection points 21 of the same set of radiating connection points 21 are arranged to each having an equal distance with respect to the physical center point 201 of the corresponding radiating source 20 and distributed around the physical center point 201 of the corresponding radiating source 20 with equal angle therebetween.

Figure 17F:
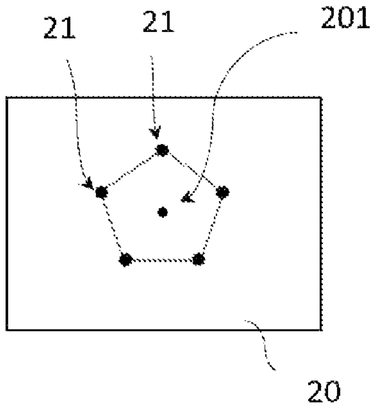

As shown in FIG. 17F, the set of radiating connection points 21 has five radiating connection points 21 which are respectively positioned at vertices of a pentagon which center point is positioned at the physical center point 201 of the radiating source 20, wherein the radiating connection points 21 of the same set of five radiating connection points 21 are arranged to each having an equal distance with respect to the physical center point 201 of the corresponding radiating source 20 and distributed around the physical center point 201 of the corresponding radiating source 20 with equal angle therebetween.

Figure 17G:
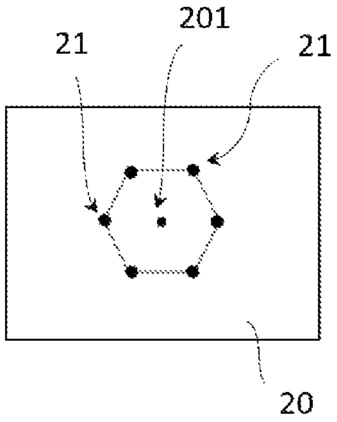

As shown in FIG. 17G, the set of radiating connection points 21 has six radiating connection points 21 which are respectively positioned at vertices of a hexagon which center point is positioned at the physical center point 201 of the radiating source 20, wherein the radiating connection points 21 of the same set of six radiating connection points 21 are arranged to each having an equal distance with respect to the physical center point 201 of the corresponding radiating source 20 and distributed around the physical center point 201 of the corresponding radiating source 20 with equal angle therebetween.

Figure 17H:
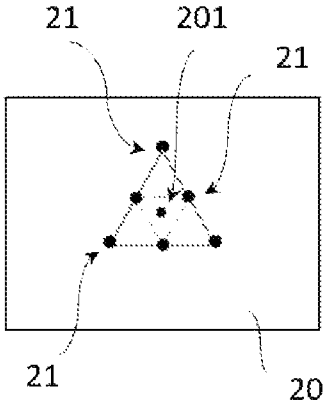

As shown in FIG. 17H, two sets of radiating connection points 21 each having three radiating connection points 21 which are respectively positioned at vertices of two triangles which center points are positioned at the physical center point 201 of the radiating source 20, wherein the radiating connection points 21 of the same set of three radiating connection points 21 are arranged to each having an equal distance with respect to the physical center point 201 of the corresponding radiating source 20 and distributed around the physical center point 201 of the corresponding radiating source 20 with equal angle 15 therebetween.

To configure the antenna of the present invention, various configurations of the at least one radiating connection point 21 and at least one feed point 22 can be achieved in combination of the arrangement of the one or more radiating connection points 21 as shown in FIGS. 17A to 17H and the one or more feed points 22 as shown in FIGS. 16A to 16E. In other words, one of the arrangements of the one or more feed points 22 as shown in FIGS. 16A to 16E can be configured with one of the arrangements of the one or more radiating connection points 21 as shown in FIGS. 17A to 17H to form the desired antenna according to the present invention. For example, as shown in FIG. 18, the arrangement of the feed points 22 as shown in FIG. 16B is configured with the arrangement of the radiating 25 connection points 21 as shown in FIG. 17D to form the radiating source 20 of the antenna, wherein at least one radiating source 20 has two feed points 22 and four radiating connection points 21, wherein the two feed points 22, which are arranged to be connected to an excitation current and the oscillating circuit to generate the electromagnetic wave signal (microwave excitation electrical signal), deviates from a physical center point 201 of the radiation source 20.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An antenna, comprising:

a reference ground; and at least one radiating source spacedly disposed at the reference ground to define a radiating clearance between the radiating source and the reference ground, wherein said at least one radiating source has one or more radiating connection points and at least one feed point deviated from a physical center point of said at least one radiation source, wherein said at least one radiating source is electrically connected to said reference ground at said one or more radiating connection points so as to feed in one or more excitation signals at said at least one feed point of said at least one radiating source, wherein since said at least one radiating source is electrically connected with said reference ground at said one or more radiating connection points, a zero potential point is formed at said physical center point of said at least one radiating source and an equivalent connection with said reference ground so as to narrowing a bandwidth of the antenna, wherein said one or more radiating connection points are arranged in form of one or more sets, wherein the same set of said one or more radiating connection points are respectively positioned at vertices of a regular polygon having a center point positioned at said physical center point of said at least one radiating source, wherein said one or more radiating connection points of the same set of said radiating connection points are arranged to each having an equal distance with respect to said physical center point of said at least one radiating source and distributed around said physical center point of said at least one radiating source with equal angle therebetween.

2. The antenna, as recited in claim 1, wherein said at least one radiating source has at least two said feed points distributed thereat around said physical center point thereof evenly and symmetrically, wherein said at least one radiating source is arranged in such a manner that said at least two feed points are fed with at least two said excitation signals with opposite phases so as to enable said at least two feed points to be distributed in symmetrical form with respect to said physical center point to strengthen a zero potential characteristic of said physical center point of said at least one radiating source.

3. The antenna, as recited in claim 1, wherein said at least one radiating source has at least two said feed points distributed thereat, and that each of said feed points is configured for being fed with one or more excitation signals, emitting electromagnetic waves, and receiving electromagnetic waves, including the reflecting waves generated and reflected from an object that the emitted electromagnetic waves encountered.

4. The antenna, as recited in claim 1, wherein said at least one radiating source has at least two said feed points distributed thereat, including a first feed point of said at least two feed points configured to emit electromagnetic waves and a second feed point of said at least two feed points configured to receive electromagnetic waves while said first and second feed points have a predetermined distance therebetween and are preferably arranged perpendicularly.

5. The antenna, as recited in claim 1, wherein said at least one radiating source has at least two said feed points distributed thereat, wherein each of said feed points has a polarization direction arranged in a perpendicular manner with respect to said physical center point of said at least one radiating source, so as to respectively receive at least two excitation signals with a phase difference of 90 degrees.

6. The antenna, as recited in claim 1, wherein said at least one radiating source has at least three said feed points, including a first feed point, a second feed point and a third feed point, wherein said first feed point and said second feed point are symmetrically distributed at said at least one radiating source with respect to said physical center point of said at least one radiating source, wherein a connecting line between said third feed point and said physical center point of said at least one radiating source is perpendicular to a connecting line between said first feed point and said second feed point.

7. The antenna, as recited in claim 1, wherein said at least one radiating source has at least four said feed points, wherein each of said four feed points is distributed at an equal angle around said physical center point of said at least one radiating source while an equal distance is arranged between each of said four feed points with said physical center point of said at least one radiating source which is electrically connected to the reference ground.

8. An antenna, comprising:

a reference ground; and at least one radiating source spacedly disposed at the reference ground to define a radiating clearance between the radiating source and the reference ground, wherein said at least one radiating source has one or more radiating connection points and at least one feed point deviated from a physical center point of said at least one radiation source, wherein said at least one radiating source is electrically connected to said reference ground at said one or more radiating connection points so as to feed in one or more excitation signals at said at least one feed point of said at least one radiating source, wherein since said at least one radiating source is electrically connected with said reference ground at said one or more radiating connection points, a zero potential point is formed at said physical center point of said at least one radiating source and an equivalent connection with said reference ground so as to narrowing a bandwidth of the antenna, wherein said one or more radiating connection points are arranged in one or more pairs, wherein the same pair of said one or more radiating connection points are symmetrically distributed at said at least one radiating source with respect to said physical center point of said at least one radiating source, wherein in correspondence to connection lines between the same pair of said one or more radiating connection points and a center point positioned at said physical center point of said at least one radiating source.

9. The antenna, as recited in claim 8, wherein said at least one radiating source has at least two said feed points distributed thereat around said physical center point thereof evenly and symmetrically, wherein said at least one radiating source is arranged in such a manner that said at least two feed points are fed with at least two said excitation signals with opposite phases so as to enable said at least two feed points to be distributed in symmetrical form with respect to said physical center point to strengthen a zero potential characteristic of said physical center point of said at least one radiating source.

10. The antenna, as recited in claim 8, wherein said at least one radiating source has at least two said feed points distributed thereat, and that each of said feed points is configured for being fed with one or more excitation signals, emitting electromagnetic waves, and receiving electromagnetic waves, including the reflecting waves generated and reflected from an object that the emitted electromagnetic waves encountered.

11. The antenna, as recited in claim 8, wherein said at least one radiating source has at least two said feed points distributed thereat, including a first feed point of said at least two feed points configured to emit electromagnetic waves and a second feed point of said at least two feed points configured to receive electromagnetic waves while said first and second feed points have a predetermined distance therebetween and are preferably arranged perpendicularly.

12. The antenna, as recited in claim 8, wherein said at least one radiating source has at least two said feed points distributed thereat, wherein each of said feed points has a polarization direction arranged in a perpendicular manner with respect to said physical center point of said at least one radiating source, so as to respectively receive at least two excitation signals with a phase difference of 90 degrees.

13. The antenna, as recited in claim 8, wherein said at least one radiating source has at least three said feed points, including a first feed point, a second feed point and a third feed point, wherein said first feed point and said second feed point are symmetrically distributed at said at least one radiating source with respect to said physical center point of said at least one radiating source, wherein a connecting line between said third feed point and said physical center point of said at least one radiating source is perpendicular to a connecting line between said first feed point and said second feed point.

14. The antenna, as recited in claim 8, wherein said at least one radiating source has at least four said feed points, wherein each of said four feed points is distributed at an equal angle around said physical center point of said at least one radiating source while an equal distance is arranged between each of said four feed points with said physical center point of said at least one radiating source which is electrically connected to the reference ground.

15. An antenna, comprising:

a reference ground; and at least one radiating source spacedly disposed at the reference ground to define a radiating clearance between the radiating source and the reference ground, wherein said at least one radiating source has at least one radiating connection point and at least one feed point deviated from a physical center point of said at least one radiation source, wherein said at least one radiating source is electrically connected to said reference ground at said at least one radiating connection point so as to feed in one or more excitation signals at said at least one feed point of said at least one radiating source, wherein since said at least one radiating source is electrically connected with said reference ground at said at least one radiating connection point, a zero potential point is formed at said physical center point of said at least one radiating source and an equivalent connection with said reference ground so as to narrowing a bandwidth of the antenna, wherein said at least one radiating source has at least two said feed points distributed thereat around said physical center point thereof evenly and symmetrically, wherein said at least one radiating source is arranged in such a manner that said at least two feed points are fed with at least two said excitation signals with opposite phases so as to enable said at least two feed points to be distributed in symmetrical form with respect to said physical center point to strengthen a zero potential characteristic of said physical center point of said at least one radiating source.

16. An antenna, comprising:

a reference ground; and at least one radiating source spacedly disposed at the reference ground to define a radiating clearance between the radiating source and the reference ground, wherein said at least one radiating source has at least one radiating connection point and one or more feed points deviated from a physical center point of said at least one radiation source, wherein said at least one radiating source is electrically connected to said reference ground at said at least one radiating connection point so as to feed in one or more excitation signals at said one or more feed points of said at least one radiating source, wherein since said at least one radiating source is electrically connected with said reference ground at said at least one radiating connection point, a zero potential point is formed at said physical center point of said at least one radiating source and an equivalent connection with said reference ground so as to narrowing a bandwidth of the antenna, wherein each of said one or more feed points is distributed at an equal angle around said physical center point of said at least one radiating source while an equal distance is arranged between each of said one or more feed points with said physical center point of said at least one radiating source which is electrically connected to the reference ground.

* * * * *